(12) United States Patent
Jeong

(10) Patent No.: US 6,532,240 B1
(45) Date of Patent: Mar. 11, 2003

(54) DIGITAL TRUNK CIRCUIT SUPPORTING MULTIPLE TRUNK CIRCUITS

(75) Inventor: Chang-Rae Jeong, Seoul (KR)

(73) Assignee: Samsung Electronics Co. Ltd., Suwon (KR)

( * ) Notice: Subject to any disclaimer, the term of this patent is extended or adjusted under 35 U.S.C. 154(b) by 0 days.

(21) Appl. No.: 09/352,379

(22) Filed: Jul. 13, 1999

(30) Foreign Application Priority Data

Jul. 13, 1998 (KR) ............................................ 98-28129

(51) Int. Cl.[7] .................................................. H04J 3/16
(52) U.S. Cl. ........................ 370/465; 370/465; 370/466; 370/467
(58) Field of Search ................................. 370/465, 466, 370/467, 397

(56) References Cited

U.S. PATENT DOCUMENTS

| | | |
|---|---|---|
| 4,499,461 A | 2/1985 | Schneider |
| 4,694,452 A | 9/1987 | Beckinger et al. |
| 4,829,491 A | 5/1989 | Saugeon et al. |
| 5,060,227 A | 10/1991 | Finley et al. |
| 5,077,735 A | 12/1991 | Myung et al. |
| 5,526,397 A | 6/1996 | Lohman |
| 5,623,491 A * | 4/1997 | Skoog .......................... 370/397 |
| 5,708,703 A | 1/1998 | Nagaraj |
| 5,790,676 A | 8/1998 | Ganesan et al. |
| 5,799,019 A | 8/1998 | Kim et al. |
| 5,881,148 A | 3/1999 | Koenig et al. |
| 5,892,768 A | 4/1999 | Jeng |

* cited by examiner

Primary Examiner—Dang Ton
Assistant Examiner—Robert W. Wilson
(74) Attorney, Agent, or Firm—Robert E. Bushnell, Esq.

(57) ABSTRACT

A digital trunk circuit supporting multiple trunk circuits assembled in a single board. A trunk selector capable of being operated by a user, outputs trunk select information for selecting one of the multiple trunk circuits according to an operation of the user. A read only memory (ROM) stores drive programs for the respective trunk circuits. A framer and line interface serves as a T1 framer or an E1 framer according to a register value, and includes line interface nodes having a connection for the T1 framer or the E1 framer. A receiving transformer connected to an office line, receives a signal incoming from the office line. A transmission transformer connected to the office line, transmits a signal to the office line. A relay switch including a plurality of relays connected between the receiving transformer and the line interface nodes of the framer and line interface and between the transmission transformer and the line interface nodes, provides a receiving path between the line interface nodes and the receiving transformer and a transmission path between the line interface nodes and the transmission transformer, in response to relay drive control signals. A first processor determines a trunk circuit to be driven depending on the trunk select information output from the trunk selector, drives an associated drive program stored in the read only memory according to the determination result, generates a register value for determining an operation mode for a framer of the framer and line interface to provide the generated register value to the framer and line interface, and generates the relay drive control signals to provide the generated relay drive control signals to the relay switch.

20 Claims, 13 Drawing Sheets

DIGITAL TRUNK CIRCUIT SUPPORTING MULTIPLE TRUNK CIRCUITS

CLAIM OF PRIORITY

This application makes reference to, incorporates the same herein, and claims all benefits accruing under 35 U.S.C. §119 from an application entitled Digital Trunk Circuit Supporting Multiple Trunk Circuits earlier filed in the Korean Industrial Property Office on the 13th day of July 1998, and there duly assigned Serial No. 28129/1998, a copy of which is annexed hereto.

BACKGROUND OF THE INVENTION

1. Technical Field

The present invention relates generally to a digital trunk circuit, and in particular, to a digital trunk circuit supporting multiple trunk circuits assembled in a single board.

2. Related Art

In a private branch exchange (PBX) system, a trunk circuit connected between a switching circuit and an office line, forms a speech loop for the office line. Such a trunk circuit can be divided into an analog trunk circuit, connected to a public switched telephone network (PSTN), for exchanging analog signals, and a digital trunk circuit, connected to an integrated services digital network (ISDN), for exchanging digital signals.

A digital trunk circuit in a primary rate group can be divided into four kinds of trunk circuits according to a transfer rate of digital signals and a D-channel signaling method. A trunk circuit supporting a transfer rate 1.544 Megahertz (MHz) is called a T1 trunk circuit, and a trunk circuit supporting a transfer rate 2.048 MHz is called an E1 trunk. In addition, the D-channel signaling method is divided into a channel associated signaling (CAS) method and a common channel signaling (CCS) method; a primary rate interface (PRI) controls a common channel signaling signal according to a link access procedure on the D-channel (LAP-D) signaling method. As a result, the digital trunk circuit can be divided into four kinds of trunk circuits, that is, a T1 trunk circuit, an E1 trunk circuit, a T1-PRI trunk circuit and an E1-PRI trunk circuit.

However, to allow the single board to support various trunk circuits, the board should include several framers for the respective trunk circuits and associated transceivers. In particular, to support the a primary rate interface (PRI) function, the board should include an HDLC (high level data link control) controller in addition to the framers and transceivers, causing an increase in number of the elements.

Furthermore, when the single board in which various trunk circuits are assembled, is installed in an exchange system of a country where only one of the T1 and E1 trunk circuits is selectively used, the unused trunk circuit is unnecessary. To remove the unused trunk circuit, elements for the unnecessary trunk circuit are uninstalled. However, in terms of maintenance and management, this may incur a greater loss, as compared with the case where the trunk circuits are manufactured in separate boards.

I have found that inefficient and undesirable arrangements of trunk circuits can be extremely inconvenient. Efforts have been made to improve data communication circuits.

Exemplars of recent efforts in the art include U.S. Pat. No. 5,077,735 for method for an Apparatus for Mutually Converting Different Signaling Systems issued to Myung et al., U.S. Pat. No. 5,790,676 for Radio Port Controller in a Wireless Personal Communications System issued to Ganesan et al., U.S. Pat. No. 5,799,019 for Circuit for Converting Frame Data issued to Kim et al., U.S. Pat. No. 5,708,703 for Wide Range Equalizer with Line Length Detection issued to Nagaraj, U.S. Pat. No. 5,623,491 for Device for Adapting Narrowband Voice Traffic of a Local Access Network to Allow Transmission over a Broadband Asynchronous Transfer Mode Network issued to Skoog, U.S. Pat. No. 5,060,227 for Digital Telephone Switch with Simultaneous Dual PCM Format Compatibility issued to Finley et al., U.S. Pat. No. 5,526,397 for Switching Transcoder issued to Lohman, U.S. Pat. No. 4,694,452 for Switching Configuration for a Telecommunications System in Particular a PBX System with Subscriber Lins, Trunk Groups, and Interface Modules issued to Beckinger et al., U.S. Pat. No. 4,829,491 for Phased-Array Equipment issued to Saugeon et al., U.S. Pat. No. 4,499,461 for Circuit Arrangement for Centrally-Controlled Telecommunication Exchange Systems, Particularly for Time-Division Multiplex Telephone Exchange Systems, with Information Exchange Between PBX Devices issued to Schneider, U.S. Pat. No. 5,881,148 for T1 Channel Bank Control Process and Apparatus issued to Koenig et al., and U.S. Pat. No. 5,892,768 for 10/100-Base Ethernet to T1/E1 HDSL Converter and Method of Operation issued to Jeong.

The above-referenced U.S. Pat. No. 5,892,768 issued to Jeng includes an Appendix A having a brief description of T1-raining and E1-framing, here incorporated by reference.

While the above recent efforts provide advantages, I note that they fail to adequately provide an efficient and convenient digital trunk circuit supporting multiple trunk circuits.

SUMMARY OF THE INVENTION

It is, therefore, an object of the present invention to provide a digital trunk circuit supporting multiple trunk circuits assembled in a single board.

It is another object of the present invention to provide a digital trunk circuit in which various trunk circuits are assembled in a single board, and even though only one of the trunk circuits is selected, the other trunk circuits are not unnecessary.

It is further another object of the present invention to provide a digital trunk circuit in which various trunk circuits are assembled in a single board, and maintenance and management can be made separately for the respective trunk circuits.

To achieve the above object, there is provided a digital trunk circuit supporting multiple trunk circuits assembled in a single board. A digital trunk circuit supporting multiple trunk circuits assembled in a single board. A trunk selector capable of being operated by a user, outputs trunk select information for selecting one of the multiple trunk circuits according to an operation of the user. A read only memory (ROM) stores drive programs for the respective trunk circuits. A framer and line interface serves as a T1 framer or an E1 framer according to a register value, and includes line interface nodes having a connection for the T1 framer or the E1 framer. A receiving transformer connected to an office line, receives a signal incoming from the office line. A transmission transformer connected to the office line, transmits a signal to the office line. A relay switch including a plurality of relays connected between the receiving transformer and the line interface nodes of the framer and line interface and between the transmission transformer and the line interface nodes, provides a receiving path between the line interface nodes and the receiving transformer and a transmission path between the line interface nodes and the transmission transformer, in response to relay drive control signals. A first processor determines a trunk circuit to be driven depending on the trunk select information output from the trunk selector, drives an associated drive program stored in the read only memory according to the determination result, generates a register value for determining an operation mode for a framer of the framer and line interface to provide the generated register value to the framer and line interface, and generates the relay drive control signals to provide the generated relay drive control signals to the relay switch.

To achieve these and other objects in accordance with the principles of the present invention, as embodied and broadly described, the present invention provides an apparatus, comprising: a digital trunk circuit being assembled in one board and supporting a plurality of specialized trunk circuits, said digital trunk circuit comprising: a trunk selector being operated by a user and outputting trunk select information for selecting one of said plurality of specialized trunk circuits according to an operation of the user; a read only memory storing a plurality of drive programs, each respective one of said plurality of drive programs driving a respective one of said plurality of specialized trunk circuits; a framer and line interface unit operating in an operation mode selected from a first operation mode and a second operation mode according to a register value, said framer and line interface unit corresponding to a T1 framer performing T1 framing when operating in said first operation mode, said framer and line interface unit corresponding to an E1 framer performing E1 framing when operating in said second operation mode, said framer and line interface unit including line interface means providing a connection corresponding to said T1 framer and said E1 framer, said framer and line interface unit including a plurality of line interface nodes; a receiving transformer being connected to an office line and receiving a signal incoming from the office line; a transmission transformer being connected to the office line, for transmitting a signal to the office line; a relay switch including a plurality of relays, said relay switch switching in response to relay drive control signals, said relay switch switching to connect said receiving transformer and said plurality of line interface nodes to provide a receiving path between said plurality of line interface nodes and said receiving transformer, said relay switch switching to connect said transmission transformer and said plurality of line interface nodes to provide a transmission path between said plurality of line interface nodes and said transmission transformer; and a first processor identifying a particular trunk circuit selected from among said plurality of specialized trunk circuits, said particular trunk circuit corresponding to said trunk select information output from said trunk selector, said first processor driving a particular drive program selected from among said plurality of drive programs stored in said read only memory, said particular drive program corresponding to said particular trunk circuit, said first processor generating said register value being output to said framer and line interface unit, said first processor generating said relay drive control signals being output to said relay switch.

To achieve these and other objects in accordance with the principles of the present invention, as embodied and broadly described, the present invention provides an apparatus, comprising: a digital trunk circuit being assembled in one board and supporting a plurality of specialized trunk circuits, said digital trunk circuit comprising: a trunk selector being operated by a user and outputting trunk select information for selecting one of said plurality of specialized trunk circuits according to an operation of the user; a read only memory storing a plurality of drive programs, each respective one of said plurality of drive programs driving a respective one of said plurality of specialized trunk circuits; a framer and line interface unit operating in an operation mode selected from a first operation mode and a second operation mode according to a register value, said framer and line interface unit corresponding to a T1 framer performing T1 framing when operating in said first operation mode, said framer and line interface unit corresponding to an E1 framer performing E1 framing when operating in said second operation mode, said framer and line interface unit including line interface means providing a connection corresponding to said T1 framer and said E1 framer, said framer and line interface unit including a plurality of line interface nodes; a receiving transformer being connected to an office line and receiving a signal incoming from the office line; a transmission transformer being connected to the office line, for transmitting a signal to the office line; a relay switch including a plurality of relays, said relay switch switching in response to relay drive control signals, said relay switch switching to connect said receiving transformer and said plurality of line interface nodes to provide a receiving path between said plurality of line interface nodes and said receiving transformer, said relay switch switching to connect said transmission transformer and said plurality of line interface nodes to provide a transmission path between said plurality of line interface nodes and said transmission transformer; a first processor identifying a particular trunk circuit selected from among said plurality of specialized trunk circuits, said particular trunk circuit corresponding to said trunk select information output from said trunk selector, said first processor driving a particular drive program selected from among said plurality of drive programs stored in said read only memory, said particular drive program corresponding to said particular trunk circuit; and a second processor mounted on said one board, said second processor reading said trunk select information output from said trunk selector to determine a selected trunk circuit to be driven, controlling said first processor according to the determination to execute said particular drive program stored in said read only memory, generating said register value being output to said framer and line interface unit, and generating said relay drive control signal being output to said relay switch.

To achieve these and other objects in accordance with the principles of the present invention, as embodied and broadly described, the present invention provides an apparatus, comprising: a digital trunk circuit being assembled in one board and supporting a plurality of specialized trunk circuits, said digital trunk circuit comprising: a trunk selector being operated by a user and outputting trunk select information for selecting one of said plurality of specialized trunk circuits according to an operation of the user; a read only memory storing a plurality of drive programs, each respective one of said plurality of drive programs driving a respective one of said plurality of specialized trunk circuits; a framer and line interface unit operating in an operation mode selected from a first operation mode and a second operation mode according to a register value, said framer and line interface unit corresponding to a first framer performing first framing when operating in said first operation mode, said framer and line interface unit corresponding to a second framer performing second framing when operating in said second operation mode, said framer and line interface unit including line interface means providing a connection corresponding to said first framer and said second framer, said framer and line interface unit including a plurality of line interface nodes, said first framing being different from said second framing; a receiving transformer being connected to an office line and receiving a signal incoming from the office line; a transmission transformer being connected to the office line, for transmitting a signal to the office line; a relay switch including a plurality of relays, said relay switch switching in response to relay drive control signals, said relay switch switching to connect said receiving transformer and said plurality of line interface nodes to provide a receiving path between said plurality of line interface nodes and said receiving transformer, said relay switch switching to connect said transmission transformer and said plurality of line interface nodes to provide a transmission path between said plurality of line interface nodes and said transmission transformer; a first processor identifying a particular trunk circuit selected from among said plurality of specialized trunk circuits, said particular trunk circuit corresponding to said trunk select information output from said trunk selector, said first processor driving a particular drive program selected from among said plurality of drive programs stored in said read only memory, said particular drive program corresponding to said particular trunk circuit; and a second processor mounted on said one board, said second processor reading said trunk select information output from said trunk selector to determine a selected trunk circuit to be driven, controlling said first processor according to the determination to execute said particular drive program stored in said read only memory, generating said register value being output to said framer and line interface unit, and generating said relay drive control signal being output to said relay switch.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
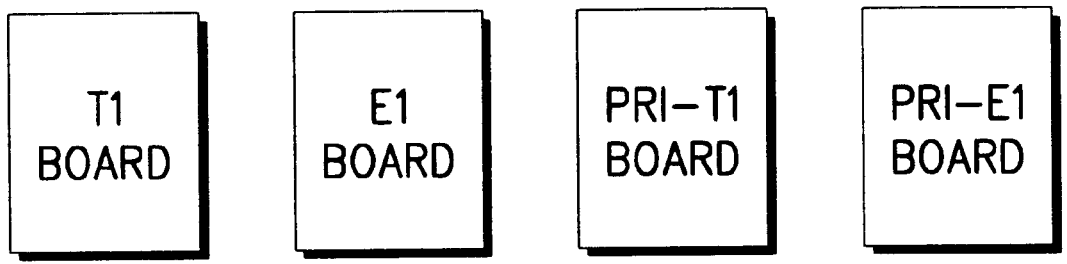
FIG. 1 is a diagram illustrating a case where respective trunk circuits are formed in separated boards.

A T1 trunk circuit, an E1 trunk circuit, a T1-PRI trunk circuit, and an E1-PRI trunk circuit can be separately embodied in four separate boards according to functions, as illustrated in FIG. 1, and the boards can be then mounted in the exchange system. However, in most of the existing trunk circuits produced by the makers, the trunk circuits are assembled in a single board, instead of several separate boards.

Figure 2:
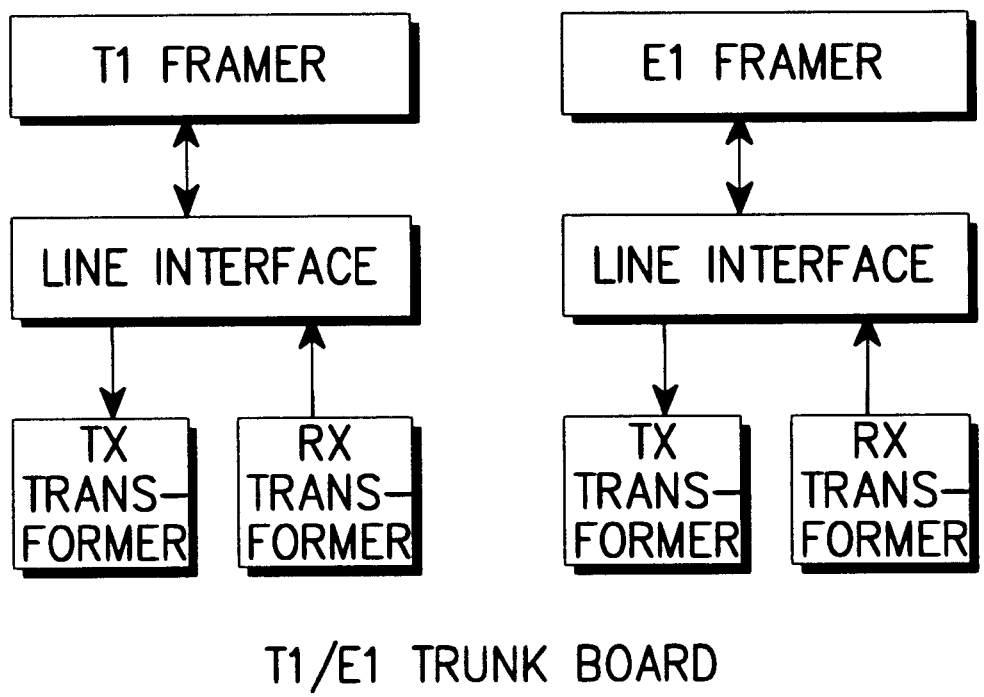
FIG. 2 is a diagram illustrating a digital trunk circuit.

FIG. 2 illustrates a digital trunk circuit, in which two kinds of trunk circuits are assembled in a single board. Referring to FIG. 2, to support two kinds of trunk circuits in a single board, there are provided two framers, and four transformers constituting transceivers connected respectively to the T1 framer and the E1 framer. In other words, there is a T1 framer, an E1 framer, two transmission (TX) transformers, and two receiving (RX) transformers. Here, for the T1 framer, MT8976 manufactured by Mitel Company, DS2180A by Dallas Company, and LXP2180A by Level One Company can be used; for the E1 framer, MT8979 by Mitel Company, DS2181A by Dallas Company, and LXP2181A by Level One Company can be used. Further, for the transceivers connected to the T1 and E1 framers, DS2186 and DS2187 manufactured by Dallas Company, or LXT301 by Level One Company can be used.

A frame is one of several segments of an analog or digital signal that has a repetitive characteristic. For example, in a time division multiplexed (TDM) system, a frame is a sequence of time slots, each containing a sample from one of the channels served by the multiplex system. The frame is repeated at the sampling rate, and each channel occupies the same sequence position in successive frames. For example, a T1 framer circuit can potentially provide T1 framing, channel formatting, signaling input and output, and other features.

The process of framing can be understood to correspond to a process of partitioning a data signal into separate groups by interleaving repetitive signals into a data stream. In a digital transmission, the process of framing is the process of inserting marker digits into a digit stream so that communication system elements can be able to identify digital groupings, such as blocks and messages, or can be able to identify channels in a time-division multiplexed bit stream. A channel is a telecommunications transmission path for voice or data or both.

In a certain country, one of the T1 and E1 trunk circuits is selectively used; in other countries the T1 and E1 trunk circuits are both used. For example, the T1 and E1 trunk circuits are both used in the Republic of Korea. However, to increase productivity, most of the trunk circuit makers assemble various kinds of trunk circuits in a single board, as shown in FIG. 2. This is because manufacturing the T1 and E1 trunk boards in two separate boards requires two manufacturing lines whereas manufacturing the T1 and E1 trunk circuits in a single board requires only one manufacturing line. In addition, the two trunk circuits have many elements which can be commonly used. Accordingly, in most cases, the trunk circuits of different functions are manufactured in a single board.

However, to allow the single board to support various trunk circuits, the board should include several framers for the respective trunk circuits and associated transceivers. In particular, to support the primary rate interface (PRI) function, the board should include a high level data link control (HDLC) controller in addition to the framers and transceivers, causing an increase in number of the elements.

Furthermore, when the single board in which various trunk circuits are assembled, is installed in an exchange system of a country where only one of the T1 and E1 trunk circuits is selectively used, the unused trunk circuit is unnecessary. To remove the unused trunk circuit, elements for the unnecessary trunk circuit are uninstalled. However, in terms of maintenance and management, this may incur a greater loss, as compared with the case where the trunk circuits are manufactured in separate boards.

A preferred embodiment of the present invention will be described hereinbelow with reference to the accompanying drawings. In the following description, well known functions or constructions are not described in detail since they would obscure the invention in unnecessary detail.

Figure 3:
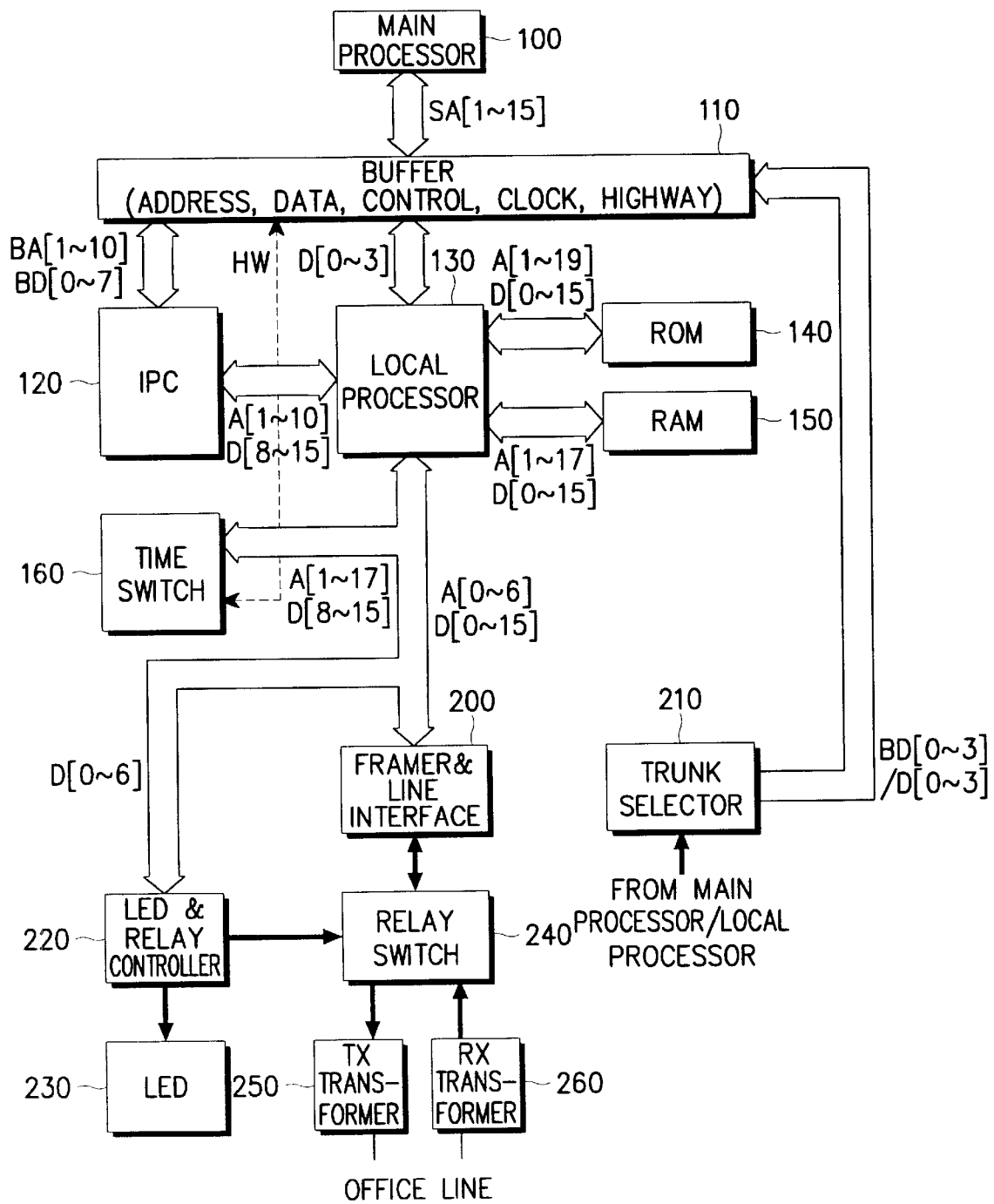
FIG. 3 is a block diagram illustrating a digital trunk circuit, in accordance with the principles of the present invention.

Referring to FIG. 3, a digital trunk circuit according to an embodiment of the present invention includes a framer and line interface 200. An integrated circuit (IC) FALC_54 with a model number PEB2254 manufactured by Siemens Company is used for the framer and line interface 200 which supports both a framer function and a line interface function. The integrated circuit FALC_54 corresponds to a framing and line interface component for PCM 30 and PCM 24. PCM corresponds to pulse code modulation.

The applicant has made the invention based partly on the fact that an integrated circuit (IC) supporting both the framer function and the line interface function is now available on the market.

In addition, by using the integrated circuit, the applicant has attempted to implement a digital trunk circuit with a reduced number of elements, thereby facilitating maintenance and management. The novel elements invented by the applicant are shown in FIG. 3, and the detailed structures thereof are illustrated in FIGS. 4 to 9B.

The FALC_54 implementing the framer and line interface 200, functions as an E1 framer and line interface in a pulse code modulation (PCM) 30 mode and serves as a T1 framer and line interface in a pulse code modulation (PCM) 24 mode. Operation of such a T1/E1 framer and line interface is controlled according to a change in values of internal registers; the change in the register values are made by a local processor 130 connected to the framer and line interface 200 via data buses D[0–15] and address buses A[0–6].

Referring again to FIG. 3, the novel digital trunk circuit further includes a trunk selector 210, a light emitting diode (LED) and relay drive controller 220, a relay switch 240, a transmission (TX) transformer 250 and a receiving (RX) transformer 260.

The trunk selector 210 which can be operated by a user, allows the user to select one of the multiple trunk circuits and outputs user controlled trunk select information. The trunk select information provided from the trunk selector 210 includes information as to whether a present signal transfer rate of the board corresponds to a transfer rate for the T1 trunk circuit or a transfer rate for the E1 trunk circuit; information as to whether the D-channel signaling employs the common channel signaling (CCS) signaling or the channel associated signaling (CAS) signaling; and information as to whether an E1 trunk circuit has a first resistance of 75 ohms (Ω) or a second resistance of 120 ohms (Ω) in the case where the E1 trunk circuit is selected. A main processor 100 or the local processor 130 reads the trunk select information output from the trunk selector 210 to execute a drive program according to the read trunk select information. That is, the main processor 100 or the local processor 130 reads the trunk select information provided from the trunk selector 210 via main data buses BD[0–3] or local data buses D[0–3], respectively, to determine which trunk circuit the trunk selector 210 has presently selected for the board, and enables the board to serve as the selected trunk circuit.

The LED and relay drive controller 220 connected to the local processor 130 via data buses D[0–6], controls driving of an LED apparatus 230 and the relay switch 240 under the control of the local processor 130. The LED apparatus 230 including a plurality of LEDs, blinks under the control of the LED and relay drive controller 220 to indicate a present state of the office line and a trunk selection state of the board. The relay switch 240 including a plurality of relays, is switched under the control of the LED and relay drive controller 220 so as to transmit pertinent signals to a T1 trunk circuit, an E1 75 ohms (Ω) trunk circuit, or an E1 120 ohms (Ω) trunk circuit. That is, the relay switch 240 is connected between the framer and line interface 200 and the TX transformer 250, and is also connected between the framer and line interface 200 and the RX transformer 260, to control transmission and reception paths therebetween.

The local processor 130 connected to a read only memory (ROM) 140 and a random access memory (RAM) 150, performs the layer 1, layer 2, and layer 3 functions. More specifically, the local processor 130 examines which trunk circuit the trunk selector 210 has presently selected for the board and enables the board to serve as the selected trunk circuit. That is, the local processor 130 receives the trunk select information output from the trunk selector 210 via the data buses D[0–3] connected to a buffer 110 to determine which trunk circuit the board is presently set to, and executes a corresponding one of the programs stored in the ROM 140 so as to enable the board to serve as the selected trunk circuit. The ROM 140 stores plural programs corresponding to the respective trunk circuits. More specifically, the ROM 140 stores programs for driving a T1 trunk circuit, a 75 ohms E1 trunk circuit, a 120 ohms E1 trunk circuit, a T1-PRI trunk circuit, a 75 ohms E1-PRI trunk circuit, and a 120 ohms E1-PRI trunk circuit.

The local processor 130 can communicate with the main processor 100 via an inter-processor communication (IPC) part 120. Therefore, an operation performed by the local processor 130 can also be performed by the main processor 100. That is, the main processor 100 receives the trunk select information output from the trunk selector 210 via the data buses BD[0–3] connected to the buffer 110 to determine which trunk circuit the board is presently set to, and enables the board to serve as the selected trunk circuit. In addition, the main processor 100 connected to the buffer 110 exchanges address, data, control signals and clocks and connects a highway via the buffer 110, to control the overall operation of the exchange. A time switch 160 being a switching element for a B-channel (mainly supporting voice data), is used in forming a speech path to an external.

An integrated multiprotocol processor with a model number MC68302 manufactured by Motorola Company can be used for the local processor 130; a dual port static random access memory (SRAM) with a model number CY7C131 manufactured Cypress Company can be used for the interprocessor communication (IPC) part 120; an erasable and programmable read only memory (EPROM) with a model number 27C4001 can be used for the ROM 140; a cache random access memory with a model number 681000 can be used for the RAM 150; and a switching element with a model number STL7065 can be used for the time switch 160.

All the elements, except the main processor 100, of FIG. 3 are mounted on the same single board to support the multiple trunk circuits. That is, under the control of the main processor 100 or the local processor 130, the digital trunk circuit according to the present invention serves as a T1 trunk circuit, a T1-PRI trunk circuit, a 75 ohms E1 trunk circuit, a 120 ohms E1 trunk circuit, a 75 ohms E1-PRI trunk circuit, or a 120 ohms E1-PRI trunk circuit. The digital trunk circuit serves as one of the above trunk circuits in the following two methods. In a first method, the main processor 100 reads the trunk select information output from the trunk selector 210 via the data buses BD[0–3] to determine which trunk circuit is presently selected for the board, and communicates with the local processor 130 via the IPC part 120 to enable the local processor 130 to initialize the corresponding program according to the determination result. In the second method, the local processor 130 directly reads the trunk select information output from the trunk selector 210 to determine which trunk circuit is presently selected for the trunk board, and executes the corresponding program according to the determination. In accordance with the determination results, the local processor 130 updates a value of the register in the framer and line interface 200, and controls the LED and relay drive controller 220 to enable the relay switch 240 to connect the transmission path for transmitting a pertinent signal according to the determination results.

Figure 4:
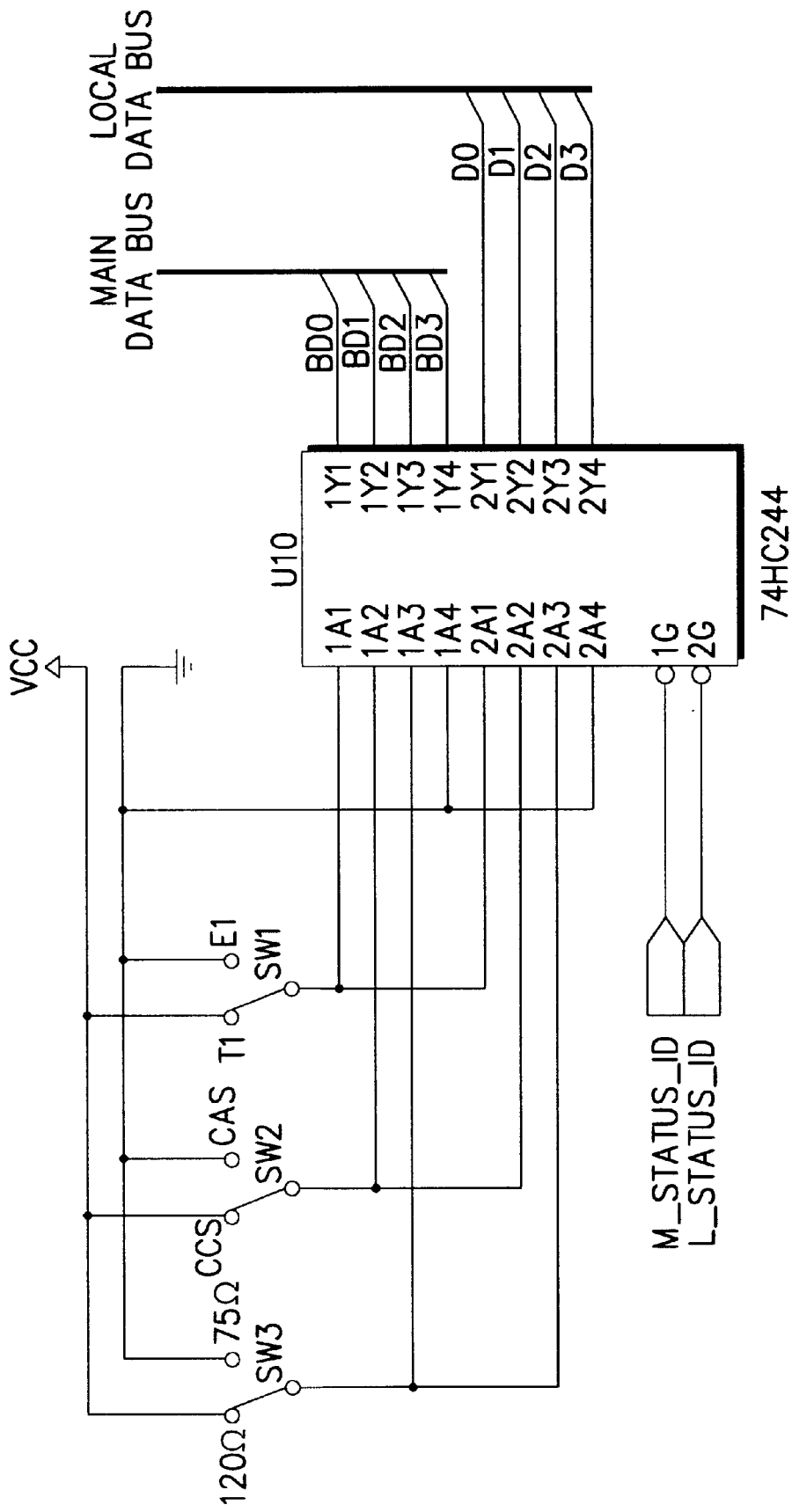
FIG. 4 is a detailed diagram illustrating a trunk selector of FIG. 3, in accordance with the principles of the present invention.

Referring to FIG. 4, the trunk selector 210 includes three switches SW1–SW3 for setting the trunk circuit select information on a hardware basis, and a buffer U10 for storing switching status values of the switches SW1–SW3 and outputting the stored switching status values to the data buses BD[0–3] or D[0–3]. The single-pole double-throw type switches SW1–SW3 have first input nodes connected to a power supply voltage VCC, second input nodes connected to the ground, and output nodes connected to input nodes 1A1–1A3 and 2A1–2A3 of the buffer U10. For the first switch SW1, switching to the first input node represents selection of a transfer rate for the T1 trunk circuit; and switching to the second input node represents selection of a transfer rate for the E1 trunk circuit. For the second switch SW2, switching to the first input node represents selection of the common channel signaling (CCS) D-channel signaling; switching to the second input node represents selection of the channel associated signaling (CAS) D-channel signaling. For the third switch SW3, switching to the first input node represents selection of a transfer rate for the 120 ohms E1 trunk circuit; switching to the second input node represents selection of a transfer rate for the 75 ohms E1 trunk circuit.

The buffer U10 has input nodes 1A1–1A4 and 2A1–2A4 for receiving the switching status values of the switches SW1–SW3, associated output nodes 1Y1–1Y4 and 2Y1–2Y4, and control nodes 1G and 2G. The input nodes 1A1 and 2A1 are connected to the output node of the first switch SW1; the input nodes 1A2 and 2A2 to the output node of the second switch SW2; the input nodes 1A3 and 2A3 to the output node of the third switch SW3; and the input nodes 1A4 and 2A4 to the ground. An octal buffer/line driver with a model number 74HC244 manufactured by Philips Company can be used for the buffer U10.

When a high level signal is applied to the nodes 1A1 and 2A1 of the buffer U10, connected to the output node of the first switch SW1, a transfer rate for the T1 trunk circuit is selected; when a low level signal is applied to the nodes 1A1 and 2A1, a transfer rate for the E1 trunk circuit is selected. When a high level signal is applied to the nodes 1A2 and 2A2 of the buffer 10, connected to the output node of the second switch SW2, the common channel signaling (CCS) is selected for the D-channel signaling; when a low level signal is applied to the nodes 1A2 and 2A2, the channel associated signaling (CAS) is selected for the D-channel signaling. When a high level signal is applied to the nodes 1A3 and 2A3 of the buffer 10, connected to the output node of the third switch SW3, the selected trunk circuit has a resistance 120 ohms; when a low level signal is applied to the nodes 1A3 and 2A3, the selected trunk circuit has a resistance 75 ohms.

In the meantime, the switching status values of the switches SW1–SW3 can be provided to the main processor 100 via the output nodes 1Y1–1Y4 of the buffer U10 and the data buses BD[0–3], or to the local processor 130 via the output nodes 2Y1–2Y4 and the data buses D[0–3], depending on control signals at the control nodes 1G and 2G of the buffer U10. That is, upon receipt of an M_STATUS_ID signal in a low level at the first control node 1G, the buffer U10 outputs the switching status values received at the input nodes 1A1–1A4 to the output nodes 1Y1–1Y4. The switching status values output from the output nodes 1Y1–1Y4 are provided to the main processor 100 via the data buses BD[0–3]. Otherwise, upon receipt of an L_STATUS_ID signal in a low level at the second control node 2G, the buffer U10 outputs the switch status values received at the input nodes 2A1–2A4 to the output nodes 2Y1–2Y4. The switching status values output from the output nodes 2Y1–2Y4 are provided to the local processor 130 via the data buses D[0–3].

As described above, determining the trunk selecting status of the board can be performed by either the main processor 100 or the local processor 130. More specifically, when the main processor 100 applies the M_STATUS_ID signal on the low level to the first control node 1G of the buffer U10, the switching status values of the switches SW1–SW3 are output at the output nodes 1Y1–1Y4 of the buffer U10. The main processor 100 then reads the switching status values output from the output nodes 1Y1–1Y4 via the data buses BD[0–3] and determines, based on the switching status values, which trunk circuit the board is presently set to. Otherwise, when the local processor 130 applies the L_STATUS_ID signal on the low level to the second control node 2G of the buffer U10, the switching status values of the switches SW1–SW3 are output at the output nodes 2Y1–2Y4 of the buffer U10. The local processor 130 then reads the switching status values from the output nodes 2Y1–2Y4 via the data buses D[0–3] and determines, based on the switching status values, which trunk circuit the board is presently set to. In accordance with the determination results, the main processor 100 or the local processor 130 executes a corresponding program stored in the memory, that is, the ROM 140 and the RAM 150, connected to the local processor 130, so as to enable the trunk board to serve as the selected trunk circuit.

Figure 5:
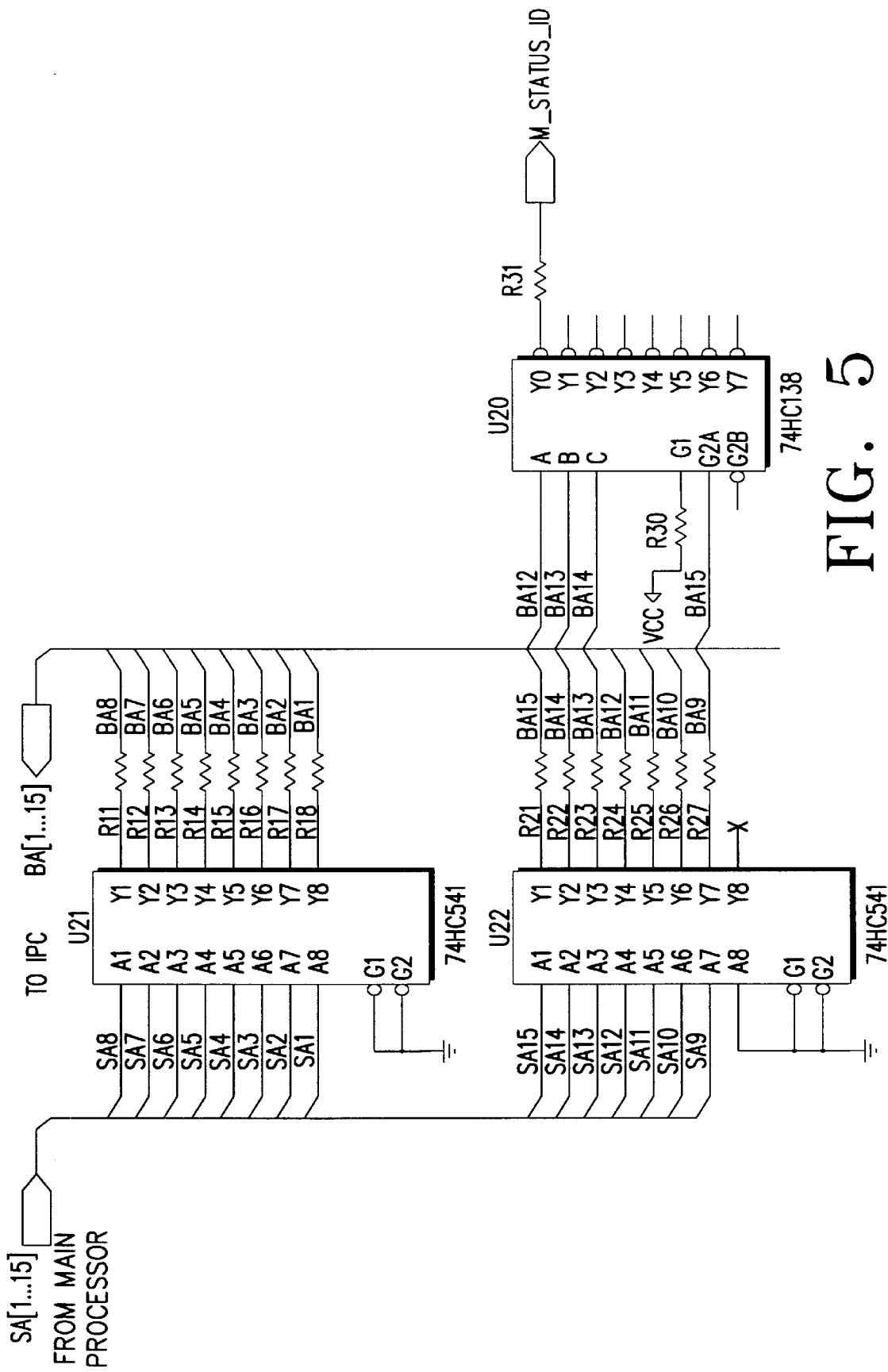
FIGS. 5 and 6 are detailed diagrams illustrating schemes for generating signals for controlling the trunk selector of FIG. 4, in accordance with the principles of the present invention.

FIG. 5 illustrates a scheme for generating the M_STATUS_ID signal for controlling the buffer U10 to output the switching status values of the switches SW1–SW3 stored therein to the output nodes 1Y1–1Y4.

Referring to FIG. 5, the control signal M_STATUS_ID to be applied to the first control node 1G of the buffer U10 in the trunk selector 210 is output at an output node Y0 of a decoder U20. An inverting 3-to-8 line decoder/demultiplexer with a model number 74HC138 manufactured by Philips Company can be used for the decoder U20. The decoder U20 having three input nodes A, B and C, eight output nodes Y0–Y7 and control signal nodes G1, G2A and G2B, decodes input signals at the input nodes A, B and C according to signal levels at the control signal nodes G1, G2A and G2B, and outputs the decoded signals to the output nodes Y0–Y7. To the input nodes A, B and C of the decoder U20 are applied address signals BA12, BA13 and BA14 out of the address signals BA[1–15] output from buffers U21 and U22. Here, an octal buffer/line driver with a model number 74HC541 manufactured by Philips Company can be used for the buffers U21 and U22. The buffers U21 and U22 receive address signals SA[8–1] and SA[15–9] provided from the main processor 100 at input nodes A1–A8 thereof, respectively and output them at output nodes Y1–Y8 after buffering. The signals output at the output nodes Y1–Y8 of the buffer U21, which have passed resisters R11–R18, become the address signals BA8–BA1, and the signals output at the output nodes Y1–Y8 of the buffer U22, which have passed resisters R21–R27, become the address signals BA15–BA9. The address signals BA[1–15] output from buffers U21 and U22 via the resistors R11–R18 and R21–R27 are applied to the IPC part 20. This is, the circuit of FIG. 5 serves as a decoding circuit which decodes the input signals from the main processor 100 and outputs the decoded signals as the control signal M_STATUS_ID for controlling operation of the buffer U10 in the trunk selector 210.

Figure 6:
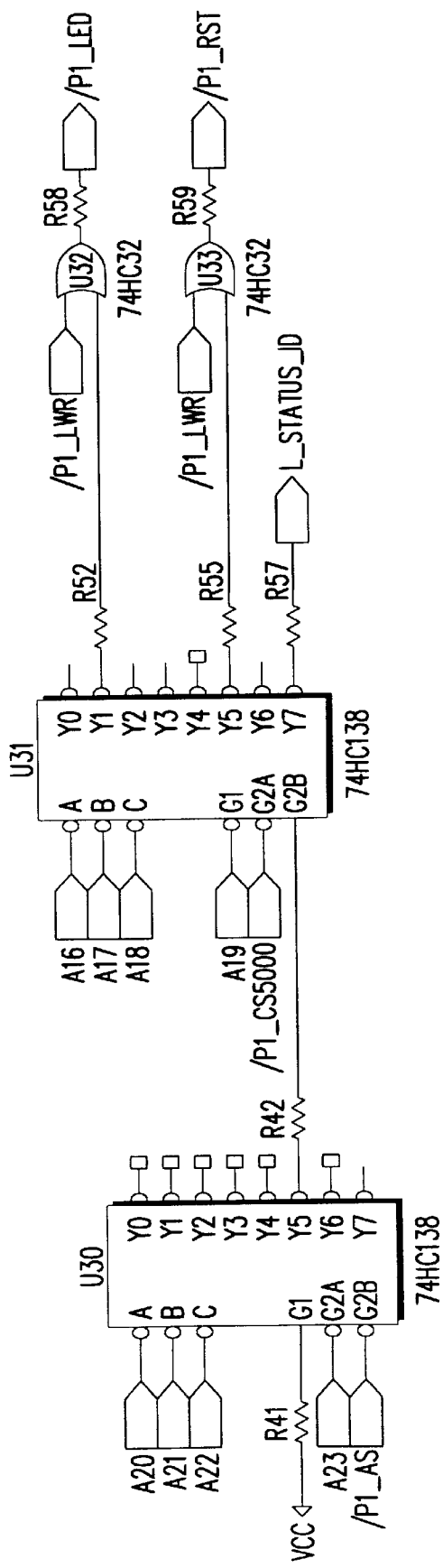

FIG. 6 illustrates a scheme for generating the control signal L_STATUS_ID for controlling output of the switching status values of the switches SW1–SW3, stored in the buffer U10 of FIG. 4.

Referring to FIG. 6, a signal output from an output node Y7 of a decoder U31 becomes the control signal L_STATUS_ID, which is applied to the second control node 2G of the buffer U10 in the trunk selector 210. An inverting 3-to-8 line decoder/demultiplexer with a model number 74HC138 manufactured by Philips Company can be used for the buffer U31. The decoder U31 having three input nodes A, B and C, eight output nodes Y0–Y7 and control signal nodes G1, G2A and G2B, decodes input signals at the input nodes A, B and C according to control signals received at the control signal nodes G1, G2A and G2B, and outputs the decoded signals at the output nodes Y0–Y7. The decoder U31 receives address signals A16, A17 and A18 at the input nodes A, B and C, respectively; and receives an address signal A19, a /P1_CS5000 signal and a signal output from an output node Y5 of a buffer U30 at the control signal nodes G1, G2A and G2B, respectively. Likewise, a decoder with a model number 74HC138 manufactured by Philips Company can be used for the buffer U30. The buffer U30 receives address signals A20, A21 and A22 at input nodes A, B and C, respectively; and receives a power supply voltage VCC, an address signal A23 and a /P1_AS signal at control signal nodes 1G, G2A and G2B, respectively. That is, the circuit of FIG. 6 decodes the signals provided from the local processor 130 and outputs the decoded signals as the control signal L_STATUS_ID for controlling output of the switching status values of the buffer U20 in the trunk selector 210.

Figure 7:
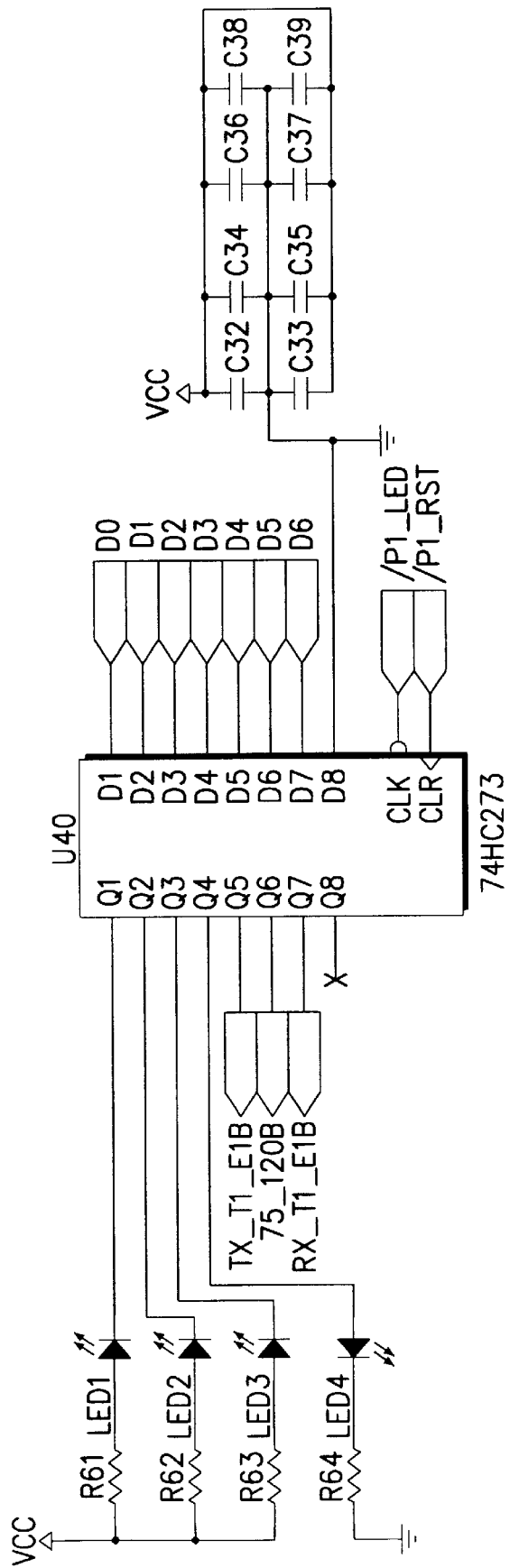
FIG. 7 is a detailed diagram illustrating a light emitting diode apparatus and a light emitting diode and relay drive controller of FIG. 3, in accordance with the principles of the present invention.

FIG. 7 illustrates in detail the LED and relay drive controller 220 and the LED apparatus 230 of FIG. 3. Referring to FIG. 7, the LED and relay drive controller 220 can be implemented by a flip-flop U40 which has eight input nodes D1–D8, eight output nodes Q1–Q8, a clock node CLK, and a clear node CLR. The LED and relay drive controller U40 can be implemented by a flip-flop, that is, an octal D-type flip-flop with reset, with a model number 74HC273 manufactured by Philips Company. The flip-flop U40 receives data signals D0–D6 at the input nodes D1–D7, and has the input node D8 connected to the ground. Capacitors C32–C39 are connected between the power supply voltage VCC and the ground. The flip-flop U40 outputs the data signals according to a /P1_LED signal received at the clock node CLK and a /P1_RST signal received at the clear node CLR. That is, the flip-flop U40 receives the data signals at the input nodes D1–D7 and outputs the received data signals at the output nodes Q1–Q7 according to the /P1_LED signal received at the clock node CLK and the /P1_RST signal received at the clear node CLR. The signals output at the output nodes Q1–Q4 of the flip-flop U40 determine driving of the LED apparatus 230, and the signals output at the output node Q5–Q7 determine driving of the relay switch 240. Further, the /P1_LED signal and the /P1_RST signal are generated by decoding the signals output from the local processor 130 as shown in FIG. 6.

The LED apparatus 230 includes LEDs LED1–LED4 and resistors R61–R64. The LED1 has an anode connected to the power supply voltage VCC via the resistor R61 and a cathode connected to the output node Q1 of the flip-flop U40. The LED2 has an anode connected to the power supply voltage VCC via the resistor R62 and a cathode connected to the output node Q2 of the flip-flop U40. The LED3 has an anode connected to the power supply voltage VCC via the resistor R63 and a cathode connected to the output node Q3 of the flip-flop U40. The LED4 has a cathode connected to the power supply voltage VCC via the resistor R64 and an anode connected to the output node Q4 of the flip-flop U40. Therefore, when the flip-flop U40 outputs the low level signals at the output nodes Q1, Q2 and Q3, the LEDs LED1–LED3 are turned on; otherwise, when the flip-flop U40 outputs the high level signals at the output nodes Q1, Q2 and Q3, the LEDs LED1–LED3 are turned off. On the contrary, however, the LED4 is turned on when the flip-flop U40 outputs the high level signal at the output node Q4; otherwise, the LED4 is turned off when the flip-flop U40 outputs the low level signal at the output node Q4. That is, the LEDs are turned on/off according to the signal levels at the output nodes Q1–Q4 of the flip-flop U40 so as to indicate a status of the office line or a status of the trunk board.

The flip-flop U40 generates not only the signals for controlling driving of the LED apparatus 230 but also the signals for controlling driving of the relay switch 240. The signals for controlling driving of the relay switch 240 are output at the output nodes Q5, Q6 and Q7. The flip-flop U40 outputs a TX_T1_E1B signal at the output node Q5, a 75_120B signal at the output node Q6 and an RX_T1_E1B signal at the output node Q7. The TX_T1_E1B signal determines a transmission path for the T1 or E1 trunk circuit. The 75_120B signal determines whether the E1 trunk circuit is 75 ohms or 120 ohms. The RX_T1_E1B signal determines a receiving path for the T1 or E1 trunk circuit.

Operations of the flip-flop U40 can be summed up as shown in Table 1. Referring to Table 1, the flip-flop U40 drives the light emitting diodes LED1–LED4 according to the signals D0–D3 received at the input nodes D1–D4, and drives the relay switch 240 according to signals D4–D6 received at the input nodes D5–D7. When the D0 signal is on the low level, the LED1 is turned on to indicate acquisition of sync. When the D1 signal is on the low level, the LED2 is turned on to indicate a line loss state. When the D2 signal is on the low level, the LED3 is turned on to indicate an alarm indication state. When the D3 signal is on the high level, the LED4 is turned on to indicate a normal state of a layer 2. When the D4 signal is on the high level, the transmission (TX) transformer 250 is connected for the use of the T1 trunk; when the D4 signal is on the low level, the TX transformer 250 is connected for the use of the E1 trunk. When the D5 signal is on the high level, the receiving (RX) transformer 260 is connected for the use of the 75 ohms E1 trunk; when the D5 signal is on the low level, the RX transformer 260 is connected for the use of the 120 ohms E1 trunk. When the D6 signal is on the high level, the RX transformer 260 is connected for the use of the T1 trunk; when the D6 signal is on the low level, the RX transformer 260 is connected for the use of the E1 trunk.

TABLE 1

| Input | Output | Level | Contents |
|---|---|---|---|
| D0 | Q1 | L | Sync |
| D1 | Q2 | L | Line loss |
| D2 | Q3 | L | Alarm Indication |
| D3 | Q4 | H | Layer 2 is normal |
| D4 | Q5 | H | TX transformer is connected for the use of T1 trunk |
|  |  | L | TX transformer is connected for the use of E1 trunk |
| D5 | Q6 | H | RX transformer is connected for the use of 75 ohms E1 trunk |
|  |  | L | RX transformer is connected for the use of 120 ohms E1 trunk |
| D6 | Q7 | H | RX transformer is connected for the use of T1 trunk |
|  |  | L | RX transformer is connected for the use of E1 trunk |

Figure 8A:
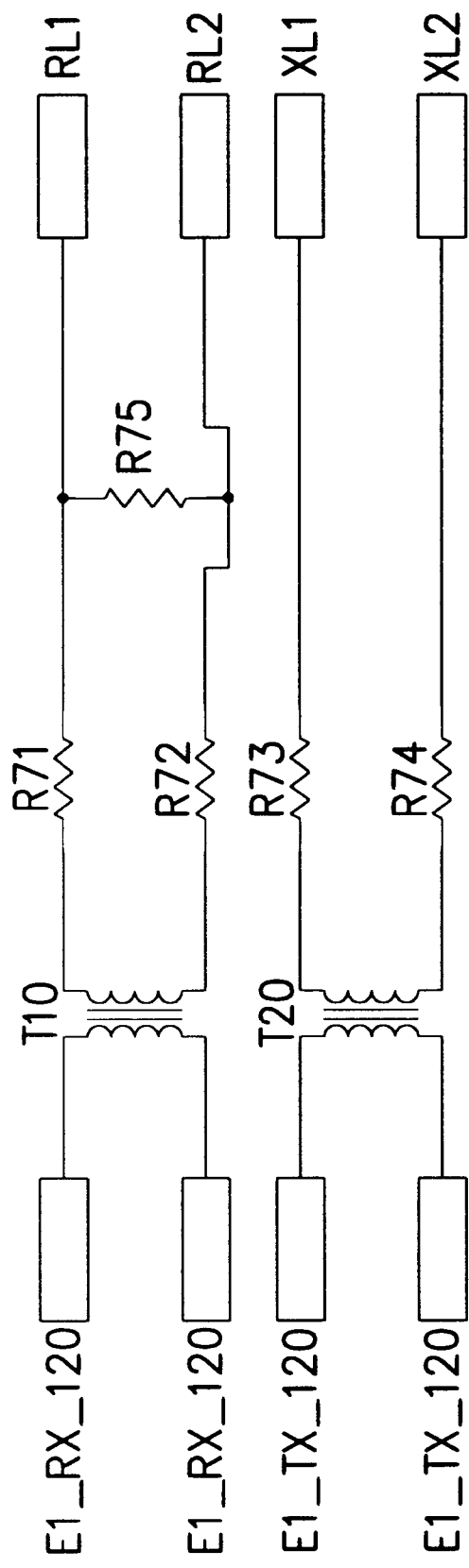
FIGS. 8A to 8C are detailed diagrams illustrating different connections of line interface nodes in a framer and line interface shown in FIG. 3, in accordance with the principles of the present invention.
Figure 8B:
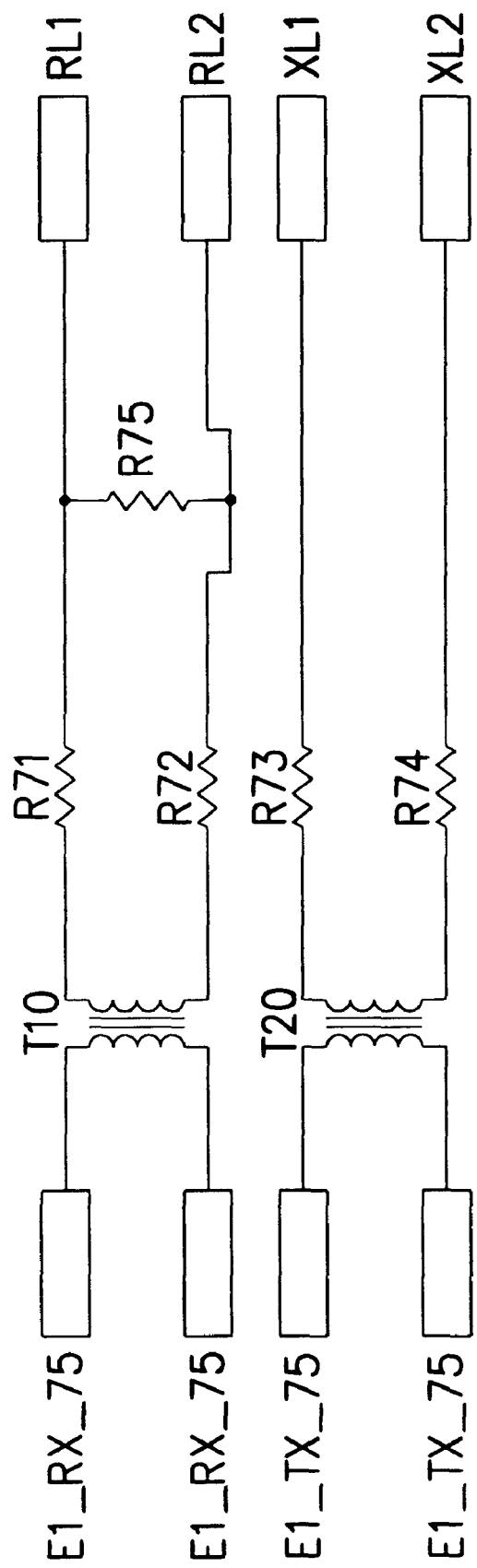
Figure 8C:
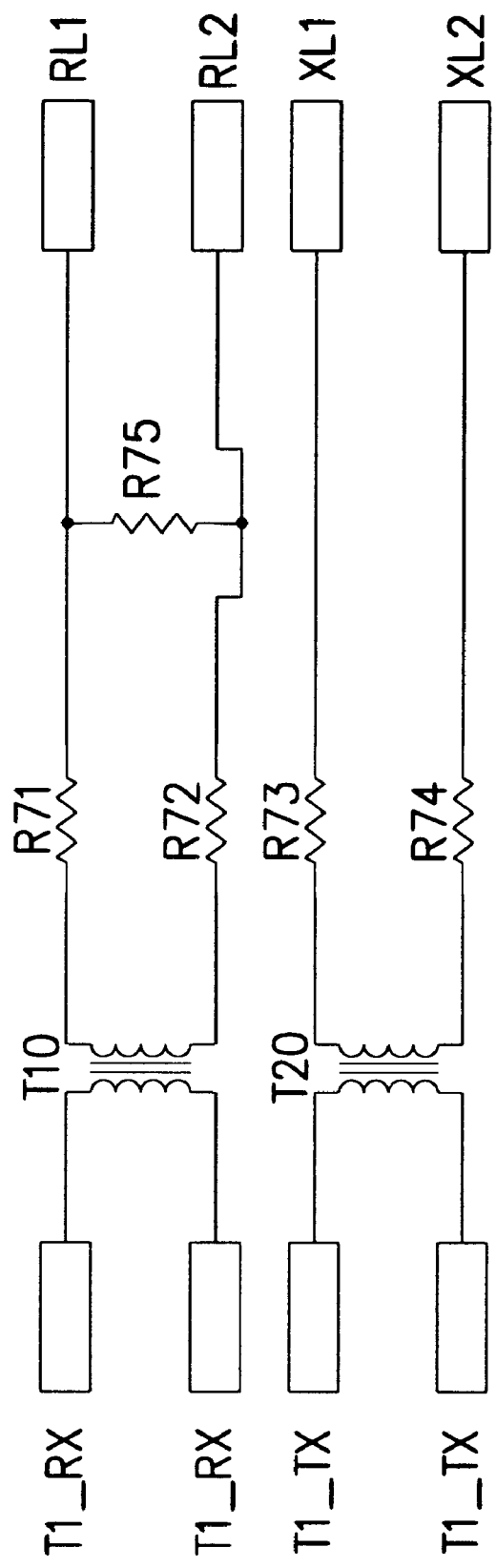

FIGS. 8A to 8C illustrate varius modifications of line interface nodes in the framer and line interface 200 according to an output of the relay switch 240 controlled by the LED and relay switch drive controller 220. In FIGS. 8A to 8C, RL1 and RL2 denote input (or receiving) nodes of the line interface, and XL1 and XL2 denote output (or transmission) nodes of the line interface. The input nodes and the output nodes are connected to the relay switch 240, as illustrated in FIG. 9B.

FIG. 8A shows a case where the line interface in the framer and line interface 200 is connected for the use of the 120 ohms E1 trunk. In this case, the internal register values of the framer and line interface 200 are set to the register values for the 120 ohms E1 trunk by the local processor 130, and the LED and relay drive controller 220 outputs the TX_T1_E1B signal on the low level, the 75_120B signal on the low level and the RX_T1_E1B signal on the low level.

FIG. 8B shows a case where the line interface in the framer and line interface 200 is connected for the use of the 75 ohms E1 trunk. In this case, the internal register values of the framer and line interface 200 are set to the register values for the 75 ohms E1 trunk by the local processor 130, and the LED and relay drive controller 220 outputs the TX_T1_E1B signal on the low level, the 75_120B signal on the high level and the RX_T1_E1B signal on the low level.

FIG. 8C shows a case where the line interface in the framer and line interface 200 is connected for the use of the T1 trunk. In this case, the internal register values of the framer and line interface 200 are set to the register values for the T1 trunk by the local processor 130, and the LED and relay drive controller 220 outputs the TX_T1 _E1B signal on the high level and the RX_T1 _E1B signal on the high level.

Figure 9:
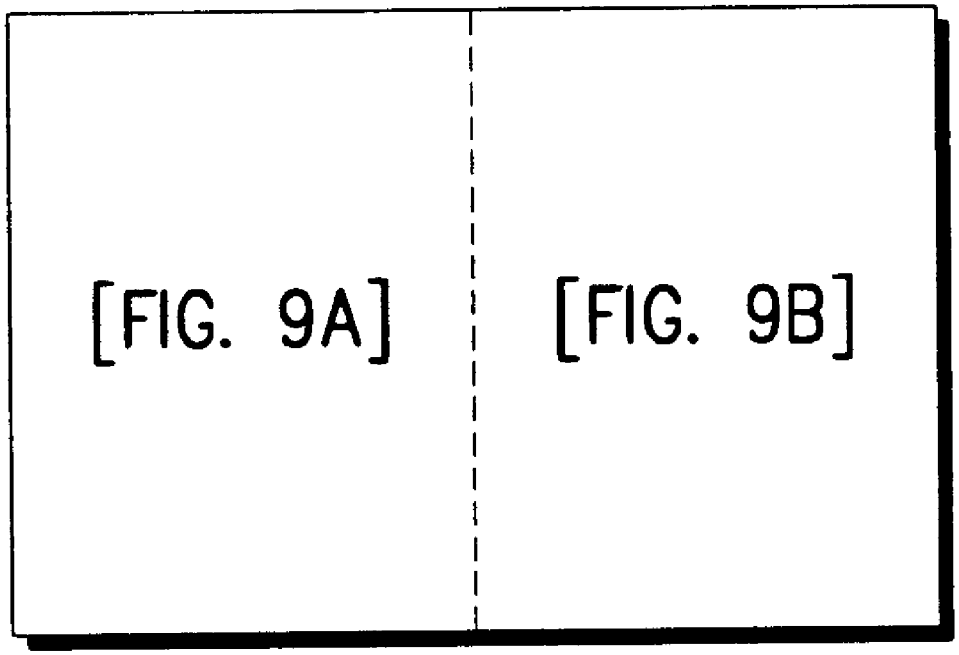
FIG. 9 shows the orientation of the coupling of the elements portrayed in FIGS. 9A and 9B, in accordance with the principles of the present invention.
Figure 9A:
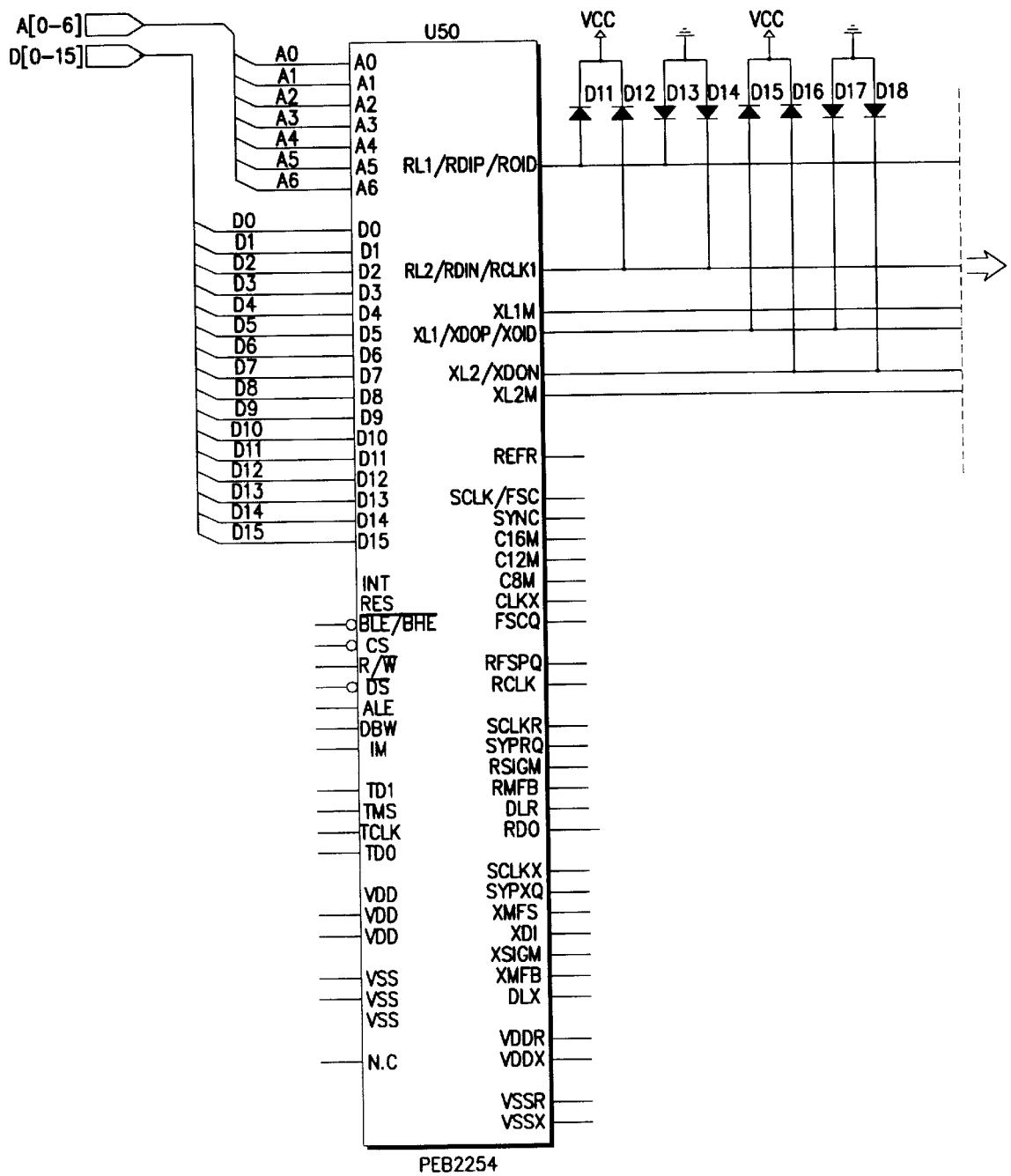
FIG. 9A is a detailed diagram illustrating a framer and line interface of FIG. 3, in accordance with the principles of the present invention.
Figure 9B:
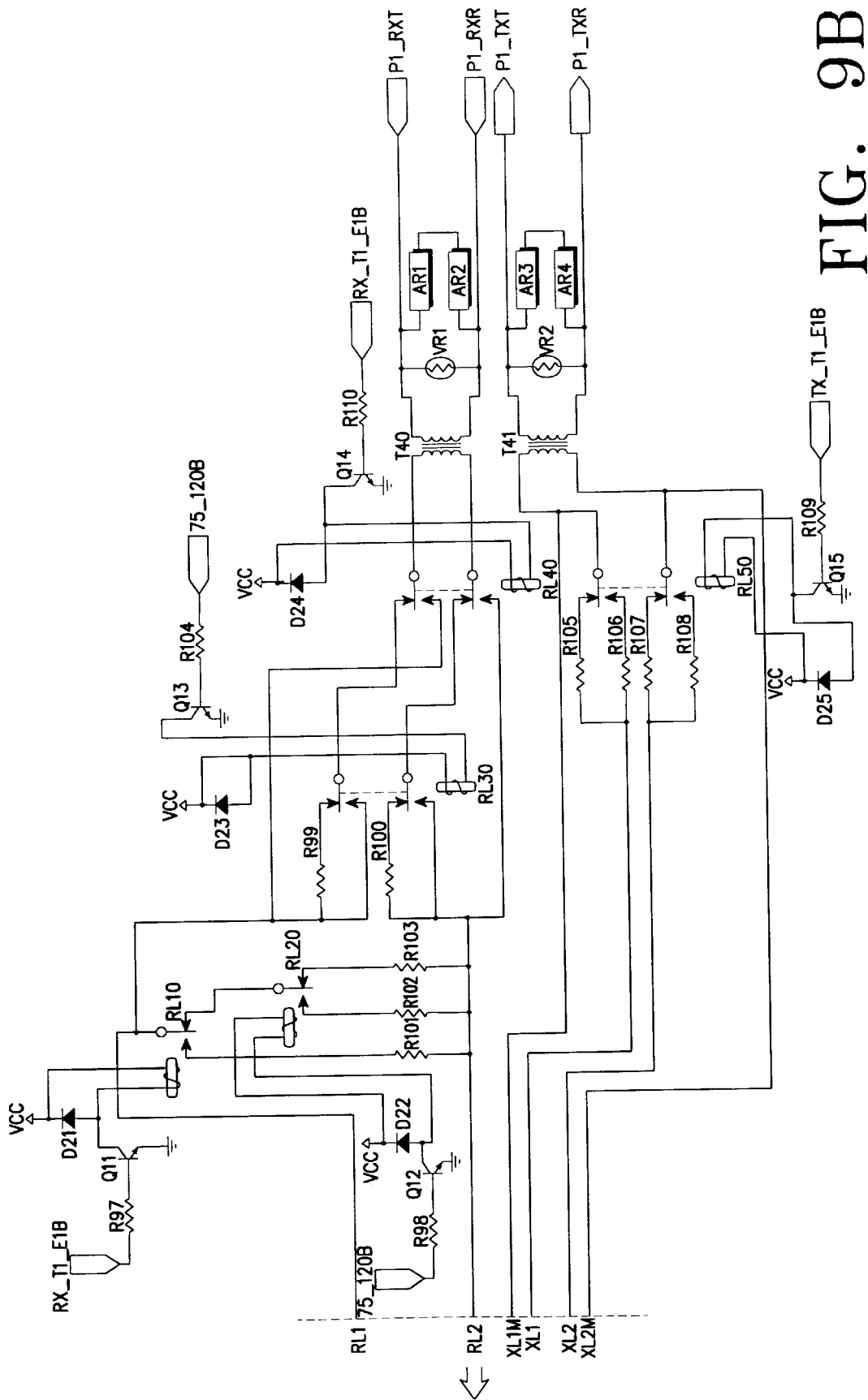
FIG. 9B is a detailed diagram illustrating a relay switch, a transmission (TX) transformer, and a receiving (RX) transformer of FIG. 3, in accordance with the principles of the present invention.

FIG. 9 shows the orientation of the coupling of the elements portrayed in FIGS. 9A and 9B, in accordance with the principles of the present invention. FIG. 9A illustrates in detail the framer and line interface 200 of FIG. 3, and FIG. 9B illustrates in detail the relay switch 240, the TX transformer 250 and the RX transformer 260.

Referring to FIG. 9A, an FALC_54 integrated circuit with a model number PEB2254 manufactured by Siemens Company can be used for the framer and line interface 200 (or U50), which supports both the farmer function and the line interface function. The framer and line interface U50 functions as an E1 framer and line interface in a PCM 30 mode, and as a T1 framer and line interface in a PCM 24 mode. Selecting the PCM 30 mode or the PCM 24 mode of the framer and line interface U50 depends on the internal register values under the control of the local processor 130. To this end, the framer and line interface U50 is connected to the local processor 130 via address buses A[0–6] and data buses D[0–15].

That is, the local processor 130 directly reads the switching status values of the trunk selector 210 via the data buses D[0–3], or the main processor 100 reads the switching status values of the trunk selector 210 via the data buses BD[0–3] and then reads the values via the IPC part 120 so as to determine the present trunk state of the board. Thereafter, the local processor 130 provides the framer and line interface U50 with data values via the data buses D[0–15] according to the determination result to set the internal register values to appropriate values, which correspond to the present switching status values of the trunk selector 210.

Therefore, the framer and line interface U50 operates in the PCM 30 mode or the PCM 24 mode to function as the T1 framer or the E1 framer. The line interface of the framer and line interface U50 is implemented in any one of the three types shown in FIGS. 8A to 8C. That is, the line interface nodes RL1, RL2, XL1 and XL2 of the framer and line interface U50 are connected as shown in FIG. 8C, for the use of the T1 trunk; connected as shown in FIG. 8B, for the use of the 75 ohms E1 trunk; and connected as shown in FIG. 8A, for the use of the 120 ohms E1 trunk.

Referring to FIG. 9B, the relay switch 240 includes relays RL10, RL20, RL30, RL40 and RL50, which are controlled according to control signals TX_T1_E1B, 75_120B and RX_T1_E1B generated from the LED and relay drive controller 220. Each of the relays includes a coil on a primary side and switches on a secondary side, and is controlled according to the control signals generated from the LED and relay drive controller 220. The relays RL10 and RL40 are switched to connect a receiving path for the T1 trunk or a receiving path for the E1 trunk in response to the RX_T1_E1B signal. The relay RL10 is connected to the line interface nodes RL1 and RL2 of the framer and line interface 200, and the relay RL40 is connected to the RX transformer 260. The relay RL20 is switched to connect a secondary node of the relay RL10 to a resistor R102 or a resistor R103 in response to the 75_120B signal. The relay RL30 connects the relay RL10 to the relay RL40 directly or via resistors R99 and R100, in response to the 75_120B signal. The relay RL50 connects a transmission path for the T1 trunk or the E1 trunk between the framer and line interface 200 and the TX transformer 250, in response to the TX_T1_E1B signal.

The relay RL10 includes a coil on the primary side and a single-pole double-throw type switch on the secondary side. The primary coil of the relay RL10 has an end connected to the power supply voltage VCC and another end connected to a collector of an NPN transistor Q11. A diode D21 is connected between both ends of the primary coil, wherein a cathode of the diode D21 is connected to the power supply voltage VCC and an anode is connected to the collector of the transistor Q11. The transistor Q11 has an emitter connected to the ground and a base connected to a resistor R97 through which the RX_T1_E1B signal is received from the LED and relay drive controller 220. The switch on the secondary side of the relay RL10 is connected to the single pole of the switch of the relay RL20 in a normal state, and is connected to the resistor R101 when a current flows in the primary coil as the transistor Q11 is turned on. Therefore, when the RX_T1_E1B signal is on the low level (that is, when the RX transformer is connected for the use of E1 trunk), the switch on the secondary side of the relay RL10 is connected to a resistor R102 or R103 via the switch on the secondary side of the relay RL20; when the RX_T1_E1B signal is on the high level (that is, when the RX transformer is connected for the use of the T1 trunk), the switch on the secondary side of the relay RL10 is connected to the resistor R101.

The relay RL20 includes a coil on the primary side and a single-pole double-throw type switch on the secondary side. The primary coil of the relay RL20 has an end connected to the power supply voltage VCC and another end connected to a collector of an NPN transistor Q12. A diode D22 is connected between both ends of the primary coil, wherein a cathode of the diode D22 is connected to the power supply voltage VCC and an anode is connected to the collector of the transistor Q12. The transistor Q12 has an emitter connected to the ground and a base connected to a resistor R98 through which the 75_120B signal is received from the LED and relay drive controller 220. The switch on the secondary side of the relay RL20 is connected to the resistor R103 in a normal state, and is connected to the resistor R102 when a current flows in the primary coil as the transistor Q12 is turned on. Therefore, when the 75_120B signal is on the low level (i.e., when the RX transformer is connected for the use of 120 ohms E1 trunk), the switch on the secondary side of the relay RL20 is connected to a resistor R103; when the 75_120B signal is on the high level (i.e., when the RX transformer is connected for the use of the 75 ohms E1 trunk), the switch on the secondary side of the relay RL20 is connected to the resistor R102.

The relay RL30 includes a coil on the primary side and two single-pole double-throw type switches on the secondary side. The primary coil of the relay RL30 has an end connected to the power supply voltage VCC and another end connected to a collector of an NPN transistor Q13. A diode D23 is connected between both ends of the primary coil, wherein a cathode of the diode D23 is connected to the power supply voltage VCC and an anode is connected to the collector of the transistor Q13. The transistor Q13 has an emitter connected to the ground and a base connected to a resistor R104 through which the 75_120B signal is received from the LED and relay drive controller 220. The switches on the secondary side of the relay RL30 are connected to resistors R99 and R100 in a normal state, and are connected to the RL1 and RL2 nodes of the framer and line interface 200 when a current flows in the primary coil as the transistor Q13 is turned on. Therefore, when the 75_120B signal is on the low level (that is, when the RX transformer is connected for the use of 120 ohms E1 trunk), the switches on the secondary side of the relay RL30 are connected to the RL1 and RL2 nodes of the farmer and line interface 200 via the resistors R99 and R100; when the 75_120B signal is on the high level (that is, when the RX transformer is connected for the use of the 75 ohms E1 trunk), the switches on the secondary side of the relay RL30 are connected directly to the RL1 and RL2 nodes of the framer and line interface 200.

The relay RL40 includes a coil on the primary side and two single-pole double-throw type switches on the secondary side. The primary coil of the relay RL40 has an end connected to the power supply voltage VCC and another end connected to a collector of an NPN transistor Q14. A diode D24 is connected between both ends of the primary coil, wherein a cathode of the diode D24 is connected to the power supply voltage VCC and an anode is connected to the collector of the transistor Q14. The transistor Q14 has an emitter connected to the ground and a base connected to a resistor R110 through which the RX_T1_E1B signal is received from the LED and relay drive controller 220. The switches on the secondary side of the relay RL40 are connected to the switches on the secondary side of the relay RL30 in a normal state, and are connected to the RL1 and RL2 nodes of the framer and line interface 200 when a current flows in the primary coil as the transistor Q14 is turned on. Therefore, when the RX_T1_E1B signal is on the low level (i.e., when the RX transformer is connected for the use of E1 trunk), the switches on the secondary side of the relay RL40 are connected to the RL1 and RL2 nodes of the farmer and line interface 200 via the resistors R99 and R100; when the RX_T1_E1B signal is on the high level (i.e., when the RX transformer is connected for the use of the T1 trunk), the switches on the secondary side of the relay RL40 are connected directly to the RL1 and RL2 nodes of the framer and line interface 200.

The relay RL50 includes a coil on the primary side and two single-pole double-throw type switches on the secondary side. The primary coil of the relay RL50 has an end connected to the power supply voltage VCC and another end connected to a collector of an NPN transistor Q15. A diode D25 is connected between both ends of the primary coil, wherein a cathode of the diode D25 is connected to the power supply voltage VCC and an anode is connected to the collector of the transistor Q15. The transistor Q15 has an emitter connected to the ground and a base connected to a resistor R109 through which the TX_T1_E1B signal is received from the LED and relay drive controller 220. The switches on the secondary side of the relay RL50 are connected to the XL1 and XL2 nodes of the framer and line interface 200 via resistors R105 and R107 in a normal state, and are connected to the XL1 and XL2 nodes of the framer and line interface 200 via resistors R106 and R108 when a current flows in the primary coil as the transistor Q15 is turned on. Therefore, when the TX_TL_E1B signal is on the low level (i.e., when the TX transformer is connected for the use of E1 trunk), the switches on the secondary side of the relay RL50 are connected to the XL1 and XL2 nodes of the farmer and line interface 200 via the resistors R105 and R107; when the TX_T1_E1B signal is on the high level (i.e., when the TX transformer is connected for the use of the T1 trunk), the switches on the secondary side of the relay RL50 are connected to the XL1 and XL2 nodes of the framer and line interface 200 via the resistors R106 and R108.

In FIG. 9B, a transformer T40 is the RX transformer 260 and a transformer T41 is the TX transformer 250. The transformer T40 has a primary coil connected to the switches on the secondary side of the relay RL40 and a secondary coil connected to receiving ports P1_RXT and P1_RXR of the trunk board. The transformer T41 has a primary coil connected to the switches on the secondary side of the relay R50 and a secondary coil connected to transmission ports P1_TXT and P1_TXR. The receiving ports P1_RXT and P1_RXR and the transmission ports P1_TXT and P1_TXR of the trunk board are connected to the office line. An overvoltage protection element VR1 and surge protection elements AR1 and AR2 are connected in parallel to the secondary coil of the transformer T40. Similarly, an overvoltage protection element VR2 and surge protection elements AR3 and AR4 are connected in parallel to the secondary coil of the transformer T41.

Now, reference will be made to operation of the digital trunk circuit according to the present invention. Herein, a description will be made with reference to a case where the local processor 130 determines which trunk circuit the trunk board has presently selected, by reading the switching status values from the trunk selector 210, and enables the trunk board to serve as the selected trunk circuit. However, as mentioned above, such an operation can be also performed by the main processor 100.

(1) Setting to T1 Trunk Circuit

In this case, the switch SW1 of FIG. 4 is connected is connected to the power supply voltage VCC and the switch SW2 is connected to the ground. Therefore, the buffer U10 receives the high level signal at the input nodes 1A1 and 2A1 and the low level signal at the input nodes 2A1 and 2A2. The buffer U10 outputs signal values corresponding to the switching status values of the switches SW1–SW3, at the output nodes 2Y1–2Y4. The local processor 130 then reads the output values of the buffer U10 via the local data buses D[0–3] and stores them in the RAM 150. If the switch SW3 is connected to the power supply voltage VCC, the local processor 130 will read "1010" via the data buses D[0–3].

From the values read via the data buses D[0–3], the local processor 130 can determine which trunk circuit the trunk board is presently set to. In accordance with the determination, the local processor 130 executes a program for driving the T1 trunk, stored in the ROM 140, and adjusts the internal register values of the framer and line interface 200 to enable the framer and line interface 200 to operate in the PCM 24 mode and to allow the line interface nodes to have the connection of FIG. 8C. Further, the local processor 130 provides the LED and relay drive controller 220 with the D4 and D6 signals on the high level for connecting the TX/RX paths for the T1 trunk circuit. The LED and relay drive controller 220 then generates the TX_T1_E1B and RX_T1_E1B signals on the high level.

Upon receipt of the RX_T1_E1B signal on the high level and the 75_120B signal on the low level, the transistors Q12 and Q13 in the relay switch 240 are turned off, and the transistors Q11 and Q14 are turned on, so that the current flows in the primary coils of the relays RL10 and RL40. Thus, an upper end of the primary coil of the RX transformer T40 is connected to the RL1 node of the framer and line interface 200 via an upper switch on the secondary side of the relay RL40, and a lower end of the primary coil of the RX transformer T40 is connected to the RL2 node of the framer and line interface 200 via a lower switch on the secondary side of the relay RL40, thereby forming the receiving path for the T1 trunk. Further, between the RL1 and RL2 nodes of the framer and line interface 200 is formed another path via the switch on the secondary side of the relay RL10 and the resistor R101.

Upon receipt of the TX_T1_E1B signal on the high level, the transistor Q15 in the relay switch 240 is turned on, so that the current flows in the primary coil of the relay RL50. Thus, an upper end of the primary coil of the TX transformer T41 is connected to the XL1 node of the framer and line interface 200 via an upper switch on the secondary side of the relay RL50 and the resistor R106, and a lower end of the primary coil of the TX transformer T41 is connected to the XL2 node of the framer and line interface 200 via a lower switch on the secondary side of the relay RL50 and the resistor R108, thereby forming the transmission path for the T1 trunk. Further, the upper end of the primary coil of the TX transformer T41 is connected to the XL1M node of the framer and line interface 200 and the lower end of the primary coil of the TX transformer T41 is connected to the XL2M node of the framer and line interface 200.

(2) Setting to 75 ohms E1 Trunk Circuit

In this case, the switches SW1–SW3 of FIG. 4 are all connected to the ground. Therefore, the buffer U10 receives the low level signals at all the input nodes 1A1–1A4 and 2A1–2A4. The buffer U10 outputs status values "0000" corresponding to the switching status values of the switches SW1–SW3, at the output nodes 2Y1–2Y4. The local processor 130 then reads the output values of the buffer U10 via the local data buses D[0–3] and stores them in the RAM 150.

From the values read via the local data buses D[0–3], the local processor 130 can determine which trunk circuit the trunk board is presently set to. In accordance with the determination, the local processor 130 executes a program for driving the 75 ohms E1 trunk, stored in the ROM 140, and adjusts the internal register values of the framer and line interface 200 to enable the framer and line interface 200 to operate in the PCM 30 mode and to allow the line interface nodes to have the connection of FIG. 8B. Further, the local processor 130 provides the LED and relay drive controller 220 with the D4 signal on the low level, the D5 signal on the high level and the D6 signal on the low level for connecting the TX/RX paths for the 75 ohms E1 trunk circuit. The LED and relay drive controller 220 then generates the TX_T1_E1B signal on the low level, the 75_120B signal on the high level and the RX_T1_E1B signal on the low level.

Upon receipt of the RX_T1_E1B signal on the low level and the 75_120B signal on the high level, the transistors Q11 and Q14 in the relay switch 240 are turned off, and the transistors Q12 and Q13 are turned on, so that the current flows in the primary coils of the relays RL20 and RL30. Thus, an upper end of the primary coil of the RX transformer T40 is connected to the RL1 node of the framer and line interface 200 via an upper switch on the secondary side of the relay RL40 and an upper switch on the secondary side of the relay RL30, and a lower end of the primary coil of the RX transformer T40 is connected to the RL2 node of the framer and line interface 200 via a lower switch on the secondary side of the relay RL40 and a lower switch on the secondary side of the relay RL30, thereby forming the receiving path for the 75 ohms E1 trunk. Further, between the RL1 and RL2 nodes of the framer and line interface 200 is formed another path via the switch on the secondary side of the relay RL10, the switch on the second side of the relay RL20 and the resistor R102.

Upon receipt of the TX_T1_E1B signal on the low level, the transistor Q15 in the relay switch 240 is turned off. Thus, the upper end of the primary coil of the TX transformer T41 is connected to the XL1 node of the framer and line interface 200 via the upper switch on the secondary side of the relay RL50 and the resistor R105, and the lower end of the primary coil of the TX transformer T41 is connected to the XL2 node of the framer and line interface 200 via the lower switch on the secondary side of the relay RL50 and the resistor R107, thereby forming the transmission path for the 75 ohms E1 trunk. Further, the upper end of the primary coil of the TX transformer T41 is connected to the XL1M node of the framer and line interface 200 and the lower end of the primary coil of the TX transformer T41 is connected to the XL2M node of the framer and line interface 200.

(3) Setting to 120 ohms E1 Trunk Circuit

In this case, the switches Scald SW2 of FIG. 4 are connected to the ground and the switch SW3 is connected to the power supply voltage VCC. Therefore, the buffer U10 receives the low level signals at the input nodes 1A1, 1A2, 1A4, 2A1, 2A2 and 2A4, and receives the high level signals at the input nodes 1A3 and 2A3. The buffer U10 outputs status values "0010" corresponding to the switching status values of the switches SW1–SW3, at the output nodes 2Y1–2Y4. The local processor 130 then reads the output values of the buffer U10 via the local data buses D[0–3] and stores them in the RAM 150.

From the values read via the local data buses D[0–3], the local processor 130 can determine which trunk circuit the trunk board is presently set to. In accordance with the determination, the local processor 130 executes a program for driving the 120 ohms E1 trunk, stored in the ROM 140, and adjusts the internal register values of the framer and line interface 200 to enable the framer and line interface 200 to operate in the PCM 30 mode and to allow the line interface nodes to have the connection of FIG. 8A. Further, the local processor 130 provides the LED and relay drive controller 220 with the D4, D5 and D6 signals on the low level for connecting the TX/RX paths for the 120 ohms E1 trunk circuit. The LED and relay drive controller 220 then generates the TX_T1_E1B signal, the 75_120B signal and the RX_T1_E1B signal on the low level.

Upon receipt of the RX_T1_E1B signal on the low level and the 75_120B signal on the low level, the transistors Q11–Q14 in the relay switch 240 are all turned off. Thus, an upper end of the primary coil of the RX transformer T40 is connected to the RL1 node of the framer and line interface 200 via an upper switch on the secondary side of the relay RL40, an upper switch on the secondary side of the relay RL30 and the resistor R99, and a lower end of the primary coil of the RX transformer T40 is connected to the RL2 node of the framer and line interface 200 via a lower switch on the secondary side of the relay RL40, a lower switch on the secondary side of the relay RL30 and the resistor R100, thereby forming the receiving path for the 120 ohms E1 trunk. Further, between the RL1 and RL2 nodes of the framer and line interface 200 is formed another path via the switch on the secondary side of the relay RL10, the switch on the second side of the relay RL20 and the resistor R103.

Upon receipt of the TX_T1_E1B signal on the low level, the transistor Q15 in the relay switch 240 is turned off. Thus, the upper end of the primary coil of the TX transformer T41 is connected to the XL1 node of the framer and line interface 200 via the upper switch on the secondary side of the relay RL50 and the resistor R105, and the lower end of the primary coil of the TX transformer T41 is connected to the XL2 node of the framer and line interface 200 via the lower switch on the secondary side of the relay RL50 and the resistor R107, thereby forming the transmission path for the 120 ohms E1 trunk. Further, the upper end of the primary coil of the TX transformer T41 is connected to the XL1M node of the framer and line interface 200 and the lower end of the primary coil of the TX transformer T41 is connected to the XL2M node of the framer and line interface 200.

Heretofore, the description has been made regarding the digital trunk circuit employing the channel associated signaling (CAS) signaling method. That is, the description has been made with reference to the digital trunk circuit which serves as the T1 trunk circuit, the 75 ohms E1 trunk circuit and the 120 ohms E1 trunk circuit.

However, the novel digital trunk circuit can also serve as the PRI-T1 trunk circuit, the 75 ohms PRI-E1 trunk circuit and the 120 ohms PRI-E1 trunk circuit. That is, the digital trunk circuit according to the present invention can also support the common channel signaling (CCS) signaling method. In this case, the switch SW2 in the trunk selector 210 shown in FIG. 4 is connected to the power supply voltage VCC. Therefore, the buffer U10 receives the high level signal at the input nodes 1A2 and 2A2 and outputs the high level signals at the corresponding output nodes 1Y2 and 2Y2. The local processor 130 reads the signal output at the output node 2Y2 via the local data buses D[0–3] to determine which trunk circuit the trunk board is presently set to. In accordance with the determination, the local processor 130 executes a program for driving the PRI-T1 trunk circuit, the 75 ohms PRI-E1 trunk circuit or the 120 ohms PRI-E1 trunk circuit, stored in the ROM 140, and adjusts the internal register values of the framer and line interface 200 to allow the framer and line interface 200 to operate in the PCM 30 or PCM 24 mode and allow the line interface state to have one of the connections shown in FIGS. 8A to 8C. Further, the local processor 130 controls the LED and relay drive controller 220 and the relay switch 240 so that the board may serve as a specific trunk circuit according to the present board setting status.

In enabling the novel digital trunk circuit to serve as the PRI-T1 trunk circuit, the relay switch 240 operates in the same manner as in enabling the board to serve as the T1 trunk circuit. In enabling the digital trunk circuit to serve as the 75 ohms PRI-E1 trunk circuit, the relay switch 240 operates in the same manner as in enabling the board to serve as the 75 ohms E1 trunk circuit. In enabling the digital trunk circuit to serve as the 120 ohms PRI-E1 trunk circuit, the relay switch 240 operates in the same manner as in enabling the board to serve as the 120 ohms E1 trunk circuit. Therefore, the detailed description will be avoided regarding the switching operation of the relay switch 240 which enables the novel digital trunk circuit to serve as the PRI-T1 trunk circuit, the 75 ohms PRI-E1 trunk circuit or the 120 ohms PRI-E1 trunk circuit.

As described above, the multiple trunk circuits can be assembled in a single digital trunk circuit board using a chip supporting the framer function and the line interface function, thereby facilitating maintenance and management of the individual trunk circuits.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
a digital trunk circuit being assembled in one board and supporting a plurality of specialized trunk circuits, said digital trunk circuit comprising:
a trunk selector being operated by a user and outputting trunk select information for selecting one of said plurality of specialized trunk circuits according to an operation of the user;
a read only memory storing a plurality of drive programs, each respective one of said plurality of drive programs driving a respective one of said plurality of specialized trunk circuits;
a framer and line interface unit operating in an operation mode selected from a first operation mode and a second operation mode according to a register value, said framer and line interface unit corresponding to a T1 framer performing T1 framing when operating in said first operation mode, said framer and line interface unit corresponding to an E1 framer performing E1 framing when operating in said second operation mode, said framer and line interface unit including line interface means providing a connection corresponding to said T1 framer and said E1 framer, said framer and line interface unit including a plurality of line interface nodes;
a receiving transformer being connected to an office line and receiving a signal incoming from the office line;
a transmission transformer being connected to the office line, for transmitting a signal to the office line;
a relay switch including a plurality of relays, said relay switch switching in response to relay drive control signals, said relay switch switching to connect said receiving transformer and said plurality of line interface nodes to provide a receiving path between said plurality of line interface nodes and said receiving transformer, said relay switch switching to connect said transmission transformer and said plurality of line interface nodes to provide a transmission path between said plurality of line interface nodes and said transmission transformer; and
a first processor identifying a particular trunk circuit selected from among said plurality of specialized trunk circuits, said particular trunk circuit corresponding to said trunk select information output from said trunk selector, said first processor driving a particular drive program selected from among said plurality of drive programs stored in said read only memory, said particular drive program corresponding to said particular trunk circuit, said first processor generating said register value being output to said framer and line interface unit, said first processor generating said relay drive control signals being output to said relay switch.

2. The apparatus of claim 1, said trunk selector further comprising:
a plurality of switches being operated by the user and outputting switching status values for selecting one of said plurality of specialized trunk circuits according to an operation of the user, said plurality of switches including a particular switch; and
a buffer having a plurality of input nodes connected to said plurality of switches and having a plurality of output nodes connected to said first processor, said buffer buffering said switching status values received at said plurality of input nodes, said buffer outputting at said plurality of output nodes said switching status values buffered, said plurality of input nodes including a particular input node.

3. The apparatus of claim 2, said particular switch corresponding to a single-pole double-throw type switch having a first input node connected to a power supply voltage, a second input node connected to a local reference potential, and an output node connected to said particular input node of said buffer.

4. The apparatus of claim 2, said plurality of specialized trunk circuits including a first specialized trunk circuit corresponding to a T1 trunk circuit and including a second specialized trunk circuit corresponding to a general E1 trunk circuit.

5. The apparatus of claim 4, said general E1 trunk circuit corresponding to a trunk circuit selected from among a first resistance E1 trunk circuit and a second resistance E1 trunk circuit.

6. The apparatus of claim 5, said plurality of switches further comprising:
a first switch outputting a switching status value representing a signal transfer rate for one trunk circuit selected from among said T1 trunk circuit and said general E1 trunk circuit;
a second switch outputting a switching status value representing a method selected from among a common channel signaling D-channel signaling method and a channel associated signaling D-channel signaling method; and
a third switch outputting a switching status value representing a trunk circuit selected from among said first resistance E1 trunk circuit and said second resistance E1 trunk circuit.

7. The apparatus of claim 1, further comprising a drive controller being connected between said first processor and said relay switch, said drive controller storing temporarily said relay drive control signals generated by said first processor, said drive controller outputting said relay drive control signals to said relay switch to drive said plurality of relays.

8. The apparatus of claim 7, further comprising a plurality of light emitting diodes turning on and off selectively to indicate switching states of said relay switch, said light emitting diodes indicating a present state of said digital trunk circuit.

9. The apparatus of claim 8, further comprising said first processor generating an indication signal indicating a state of the office line.

10. The apparatus of claim 9, further comprising said drive controller storing said relay drive control signals and said indication signal, outputting said relay drive control signals to said relay switch, turning on and off said light emitting diodes according to said relay drive control signals and according to said indication signal.

11. The apparatus of claim 10, said one board corresponding to one printed circuit board.

12. The apparatus of claim 1, said first processor being mounted on said one board.

13. The apparatus of claim 2, further comprising data buses coupling said plurality of output nodes of said buffer with said first processor.

14. An apparatus, comprising:
a digital trunk circuit being assembled in one board and supporting a plurality of specialized trunk circuits, said digital trunk circuit comprising:
  a trunk selector being operated by a user and outputting trunk select information for selecting one of said plurality of specialized trunk circuits according to an operation of the user;
  a read only memory storing a plurality of drive programs, each respective one of said plurality of drive programs driving a respective one of said plurality of specialized trunk circuits;
  a framer and line interface unit operating in an operation mode selected from a first operation mode and a second operation mode according to a register value, said framer and line interface unit corresponding to a T1 framer performing T1 framing when operating in said first operation mode, said framer and line interface unit corresponding to an E1 framer performing E1 framing when operating in said second operation mode, said framer and line interface unit including line interface means providing a connection corresponding to said T1 framer and said E1 framer, said framer and line interface unit including a plurality of line interface nodes;
  a receiving transformer being connected to an office line and receiving a signal incoming from the office line;
  a transmission transformer being connected to the office line, for transmitting a signal to the office line;
  a relay switch including a plurality of relays, said relay switch switching in response to relay drive control signals, said relay switch switching to connect said receiving transformer and said plurality of line interface nodes to provide a receiving path between said plurality of line interface nodes and said receiving transformer, said relay switch switching to connect said transmission transformer and said plurality of line interface nodes to provide a transmission path between said plurality of line interface nodes and said transmission transformer;
  a first processor identifying a particular trunk circuit selected from among said plurality of specialized trunk circuits, said particular trunk circuit corresponding to said trunk select information output from said trunk selector, said first processor driving a particular drive program selected from among said plurality of drive programs stored in said read only memory, said particular drive program corresponding to said particular trunk circuit; and
  a second processor mounted on said one board, said second processor reading said trunk select information output from said trunk selector to determine a selected trunk circuit to be driven, controlling said first processor according to the determination to execute said particular drive program stored in said read only memory, generating said register value being output to said framer and line interface unit, and generating said relay drive control signal being output to said relay switch.

15. The apparatus of claim 14, further comprising an inter-processor communication unit controlling communication between said first processor and said second processor.

16. The apparatus of claim 15, said trunk selector further comprising:
  a plurality of switches being operated by the user and outputting switching status values for selecting one of said plurality of specialized trunk circuits according to an operation of the user, said plurality of switches including a particular switch; and
  a buffer having a plurality of input nodes connected to said plurality of switches and having a plurality of output nodes connected to said first processor, said buffer buffering said switching status values received at said plurality of input nodes, said buffer outputting at said plurality of output nodes said switching status values buffered, said plurality of input nodes including a particular input node.

17. The apparatus of claim 16, said plurality of specialized trunk circuits including a first specialized trunk circuit corresponding to a T1 trunk circuit and including a second specialized trunk circuit corresponding to a general E1 trunk circuit.

18. An apparatus, comprising:
a digital trunk circuit being assembled in one board and supporting a plurality of specialized trunk circuits, said digital trunk circuit comprising:
  a trunk selector being operated by a user and outputting trunk select information for selecting one of said plurality of specialized trunk circuits according to an operation of the user;
  a read only memory storing a plurality of drive programs, each respective one of said plurality of drive programs driving a respective one of said plurality of specialized trunk circuits;
  a framer and line interface unit operating in an operation mode selected from a first operation mode and a second operation mode according to a register value, said framer and line interface unit corresponding to a first framer performing first framing when operating in said first operation mode, said framer and line interface unit corresponding to a second framer performing second framing when operating in said second operation mode, said framer and line interface unit including line interface means providing a connection corresponding to said first framer and said second framer, said framer and line interface unit including a plurality of line interface nodes, said first framing being different from said second framing;
  a receiving transformer being connected to an office line and receiving a signal incoming from the office line;
  a transmission transformer being connected to the office line, for transmitting a signal to the office line;
  a relay switch including a plurality of relays, said relay switch switching in response to relay drive control signals, said relay switch switching to connect said receiving transformer and said plurality of line interface nodes to provide a receiving path between said plurality of line interface nodes and said receiving transformer, said relay switch switching to connect said transmission transformer and said plurality of line interface nodes to provide a transmission path between said plurality of line interface nodes and said transmission transformer;
  a first processor identifying a particular trunk circuit selected from among said plurality of specialized trunk circuits, said particular trunk circuit corresponding to said trunk select information output from said trunk selector, said first processor driving a particular drive program selected from among said plurality of drive programs stored in said read only memory, said particular drive program corresponding to said particular trunk circuit; and a second processor mounted on said one board, said second processor reading said trunk select information output from said trunk selector to determine a selected trunk circuit to be driven, controlling said first processor according to the determination to execute said particular drive program stored in said read only memory, generating said register value being output to said framer and line interface unit, and generating said relay drive control signal being output to said relay switch.

19. The apparatus of claim 18, said first framer performing said first framing corresponding to a T1 framer performing T1 framing, said second framer performing said second framing corresponding to an E1 framer performing E1 framing.

20. The apparatus of claim 18, said trunk selector further comprising:

a plurality of switches being operated by the user and outputting switching status values for selecting one of said plurality of specialized trunk circuits according to an operation of the user, said plurality of switches including a particular switch; and a buffer having a plurality of input nodes connected to said plurality of switches and having a plurality of output nodes connected to said first processor, said buffer buffering said switching status values received at said plurality of input nodes, said buffer outputting at said plurality of output nodes said switching status values buffered, said plurality of input nodes including a particular input node;

said particular switch corresponding to a single-pole double-throw type switch having a first input node connected to a power supply voltage, a second input node connected to a local reference potential, and an output node connected to said particular input node of said buffer.

* * * * *